United States Patent
Taylor et al.

(10) Patent No.: US 11,632,345 B1
(45) Date of Patent: Apr. 18, 2023

(54) MESSAGE MANAGEMENT FOR COMMUNAL ACCOUNT

(71) Applicant: Amazon Technologies, Inc., Seattle, WA (US)

(72) Inventors: Brandon Taylor, Seattle, WA (US); Chris Parker, Seattle, WA (US); Ran Mokady, Seattle, WA (US); Christo Frank Devaraj, Seattle, WA (US); Nancy Yi Liang, Seattle, WA (US); Blair Harold Beebe, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 368 days.

(21) Appl. No.: 15/475,893

(22) Filed: Mar. 31, 2017

(51) Int. Cl.
*H04L 51/216* (2022.01)
*H04L 67/306* (2022.01)

(52) U.S. Cl.
CPC .......... *H04L 51/216* (2022.05); *H04L 67/306* (2013.01)

(58) Field of Classification Search
CPC ....... H04L 67/306; H04L 51/16; H04L 51/04; H04L 29/08936; H04L 51/10; H04L 51/32; H04L 12/185; H04L 63/104; H04L 51/24; H04L 51/046; H04L 51/18; H04L 65/403; H04L 65/4015; H04L 51/12; H04L 51/14; H04L 65/1093; H04L 12/1818; H04L 12/1822; H04L 41/0893; H04L 67/14; H04L 67/303; H04L 41/026; H04L 63/102; H04L 67/30; H04L 9/085; H04W 4/08; H04W 4/21; H04W 4/14; G06F 3/0482; G06F 3/167; G06F 17/30026; G10L 2015/223; G10L 15/26; G10L 15/265; G10L 15/22; G10L 15/08; G10L 25/54; H04N 21/42203; H04N 21/4788; H04M 1/7255; H04M 3/567; H04M 1/72552
See application file for complete search history.

(56) References Cited

U.S. PATENT DOCUMENTS

| | | | |
|---|---|---|---|
| 8,463,872 B2 * | 6/2013 | Pounds | H04L 51/22 709/219 |
| 8,887,306 B1 * | 11/2014 | Palacio | H04N 21/234336 726/28 |
| 8,959,177 B1 * | 2/2015 | Weston, Jr. | H04N 21/2393 709/217 |
| 9,147,054 B1 * | 9/2015 | Beal | G06F 21/32 |
| 9,484,030 B1 * | 11/2016 | Meaney | H04R 3/005 |
| 10,013,971 B1 * | 7/2018 | Lewis | G10L 13/02 |
| 10,360,265 B1 * | 7/2019 | Agarwal | G10L 15/1815 |

(Continued)

*Primary Examiner* — Kamal B Divecha
*Assistant Examiner* — Alex H. Tran
(74) *Attorney, Agent, or Firm* — Lee & Hayes, P.C.

(57) ABSTRACT

Systems and methods to prevent or diminish message thread explosion are disclosed. Message data sent between members of a communal profile and/or between members of multiple communal profiles may be consolidated into a single message thread, which may be displayed on devices associated with the members associated with of the communal profile(s). Consolidation of the message data into a communal message thread may allow users to more intuitively view conversations between members of their communal profile and/or between members of their communal profile and other communal profiles without viewing individual message threads between members of the communal profile(s).

18 Claims, 12 Drawing Sheets

(56) References Cited

U.S. PATENT DOCUMENTS

| | | | | |
|---|---|---|---|---|
| 10,431,216 B1* | 10/2019 | Lemon | G06F 3/0488 |
| 2004/0202117 A1* | 10/2004 | Wilson | H04W 76/45 |
| | | | 370/310 |
| 2004/0203957 A1* | 10/2004 | George | H04W 4/14 |
| | | | 455/466 |
| 2007/0156824 A1* | 7/2007 | Thompson | G06Q 10/107 |
| | | | 709/206 |
| 2008/0028027 A1* | 1/2008 | Jachner | H04L 51/04 |
| | | | 709/206 |
| 2010/0005402 A1* | 1/2010 | George | H04L 51/04 |
| | | | 715/758 |
| 2010/0125791 A1* | 5/2010 | Katis | H04M 3/42221 |
| | | | 715/716 |
| 2010/0261488 A1* | 10/2010 | Little | H04L 67/04 |
| | | | 455/466 |
| 2012/0072507 A1* | 3/2012 | Chen | H04L 51/32 |
| | | | 709/206 |
| 2012/0088527 A1* | 4/2012 | Roka | H04L 51/16 |
| | | | 455/466 |
| 2012/0265528 A1* | 10/2012 | Gruber | G10L 15/183 |
| | | | 704/235 |
| 2013/0101096 A1* | 4/2013 | Shaw | H04M 11/00 |
| | | | 379/88.13 |
| 2013/0121481 A1* | 5/2013 | Mikan | H04L 51/10 |
| | | | 379/88.14 |
| 2013/0227030 A1* | 8/2013 | Eidelson | H04L 51/066 |
| | | | 709/206 |
| 2014/0006525 A1* | 1/2014 | Freund | H04L 51/16 |
| | | | 709/206 |
| 2014/0122626 A1* | 5/2014 | Alam | H04L 51/16 |
| | | | 709/206 |
| 2016/0065519 A1* | 3/2016 | Waltermann | H04L 67/10 |
| | | | 709/206 |
| 2016/0094509 A1* | 3/2016 | Ye | H04L 51/32 |
| | | | 709/206 |
| 2016/0147435 A1* | 5/2016 | Brody | G06F 3/017 |
| | | | 715/863 |
| 2016/0173421 A1* | 6/2016 | Alshinnawi | H04L 51/16 |
| | | | 709/206 |
| 2016/0173578 A1* | 6/2016 | Sharma | H04L 51/02 |
| | | | 709/203 |
| 2016/0275588 A1* | 9/2016 | Ye | G06F 3/0488 |
| 2016/0277526 A1* | 9/2016 | Bullock | H04L 67/306 |
| 2016/0344668 A1* | 11/2016 | Young | H04L 51/10 |
| 2017/0068512 A1* | 3/2017 | Cho | G06F 3/005 |
| 2017/0118607 A1* | 4/2017 | Scott | H04W 4/16 |
| 2017/0149706 A1* | 5/2017 | Amble | H04L 67/306 |
| 2017/0149713 A1* | 5/2017 | Bastide | H04L 51/06 |
| 2017/0337790 A1* | 11/2017 | Gordon-Carroll | |
| | | | G06F 16/9537 |
| 2018/0007210 A1* | 1/2018 | Todasco | H04M 3/53366 |
| 2018/0013709 A1* | 1/2018 | Pittner | H04L 51/18 |
| 2018/0014189 A1* | 1/2018 | Ellison | G10L 17/22 |
| 2018/0069815 A1* | 3/2018 | Fontana | H04L 51/04 |
| 2018/0095940 A1* | 4/2018 | Meixner | G06F 3/0484 |
| 2020/0178043 A1* | 6/2020 | Cavalcanti | H04W 4/08 |

\* cited by examiner

MESSAGE MANAGEMENT FOR COMMUNAL ACCOUNT

BACKGROUND

Users select recipients to send messages to. When messages are sent between devices, message threads are created. Each message thread may be displayed on a sending device and receiving device. Senders may select multiple recipients to send a message to, and a message thread may be created that includes the sender and the selected recipients.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
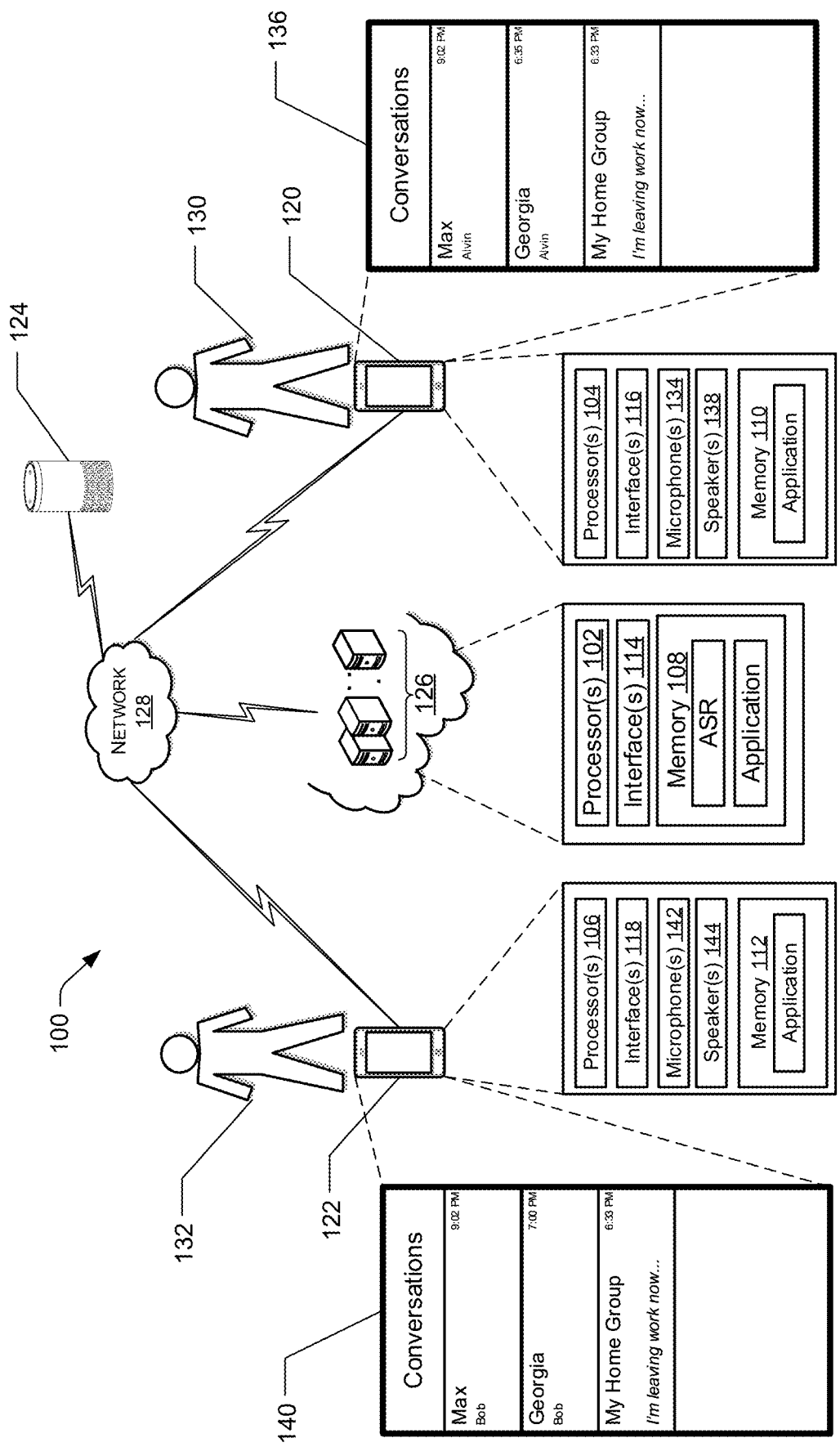
FIG. 1 illustrates a schematic diagram of an example system for communal account message management.

Systems and methods for managing messages for a communal account are described herein. Communication means have expanded with the advent of mobile devices and communal devices, such as voice-assistant devices. Not only can individuals use these devices to send audio, video, and textual messages back and forth to each other's devices, but groups of users may also desire to send such messages between devices. The systems and methods described herein provide a user experience where message data sent between user profiles included in a communal profile are consolidated and displayed in a single message thread. Additionally, the systems and methods described herein provide for a user experience where message data sent between user profiles of different communal profiles are consolidated and displayed in a single message thread. By so doing, the present systems and methods allow users to more intuitively view conversations between user profiles of their group and/or between user profiles of their group and other groups without viewing individual message threads between user profiles of the group(s).

For example, envision a communal profile corresponding to a home group that includes Alvin, Bob, and Carol. As used herein, users may be associated with a communal profile based on one or more factors. The factors may include, for example, which user profiles have been selected to be in a communal profile, which user profiles are associated with a given device, such as a device with a voice user interface (VUI), which may be a voice-assistant device, which users have access to the device with the VUI, which user profiles correspond to users that reside together, which user profiles correspond to users that are related to each other, such as through a familial relationship, and/or which user profiles have sent and/or received messages with related content. For example, a "home group" may include user profiles that correspond to users that reside in a particular home together that have been associated with a given VUI. The VUI as used herein may be associated with one or more devices that are used by and/or associated with multiple users, user profiles, and/or user accounts.

Each of these user profiles may send message data to each other and to their communal profile. A graphic illustration of this may be as follows:

Alvin may send a message to Bob and/or Carol;
Bob may send a message to Alvin and/or Carol;
Carol may send a message to Alvin and/or Bob;
Alvin, Bob, and/or Carol may send a message to Home, the alias for the communal profile; and/or
Home may send a message to Alvin, Bob, and/or Carol.

Each of these messages may be presented as their own individual message threads, such as on a user interface on devices associated with the members of the communal profile, which may be difficult for users to manage and see which threads are related to each other.

To alleviate these issues, message thread consolidation is performed, as described herein. Staying with the example provided above, messages sent between Alvin and Bob and/or the communal profile may be consolidated into one communal profile thread, which may be displayed on the user devices as one thread. For example, Alvin may desire to send a message to the members of his communal profile, which may be his home group, including Bob and other users that have been selected and/or chosen for inclusion in the home group, such as Carol. Alvin may type a message to be sent to the home group or Alvin may record an audio and/or image message to be sent to the home group from Alvin's mobile device or a communal device. Alvin's message may be sent to Bob and the other members of the home group. Bob and/or other members of the home group may respond to Alvin's message. Instead of each individual message thread being displayed on Alvin and Bob's mobile devices, the message threads are consolidated into a home group thread. Additional messages to or from user profiles of the group may be merged or otherwise added to the home group thread. Additionally, or alternatively, message data sent and/or received between user profiles of the communal profile may be merged into the home group thread even in stances where a particular message is not directed to each member of the home group, such as when Alvin desires to send a message only to Bob. In this example, while each of the messages is merged into the home group thread, one or more access control features are utilized to control which user devices, user profiles, and/or user accounts may view and/or hear such messages. For example, even when a message is sent to a home group user profile personally, all other user profiles of the communal profile may be prevented from viewing and/or hearing such personal messages. By so doing, all message data sent between user profiles of a communal profile may be consolidated into a single communal thread to allow users to easily see such message data without having to coordinate multiple user threads, while also allowing communal profile members to send messages to individual user profiles without those messages being displayed or output to unintended members.

The message thread consolidation described herein may also be performed across communal profiles. For example, expanding on the example above, Alvin, Bob, and Carol are associated with a first communal profile. David and Ellen are associated with a second communal profile. In this example, Alvin, Bob, and Carol may be part of the same family, may reside together, and/or may have user accounts and/or profiles that are associated with a first communal device. David and Ellen are part of a different family, reside together in a different home, and/or may have user accounts and/or profiles that are associated with a second communal device. Alvin may send a message with an indication that the message should be sent from the first communal to the second communal profile. That message may be sent to each user profile and/or selected user profiles of the first communal profile and the second communal profile and may be displayed on mobile devices associated with user profiles of both communal profiles. Subsequent reply messages may be sent by Bob, Carol, David, Ellen, or another user of the first communal profile and/or the second communal profile, and each reply message may be consolidated with Alvin's message into a communal message thread. The communal message thread may be displayed on each user's device associated with the first and second communal profiles.

A user-configurable setting may allow one or more users associated with the first and second communal profiles to select the members and/or member profiles of the first and second communal profiles. The user-configurable setting may also allow one or more users to select default operations when messages are sent between user profiles of the first and second communal profiles. For example, a default operation may cause any messages sent between any user profile of either communal profile to another user profile of either communal profile to be included in a consolidated message thread and to be displayed on devices associated with the user profiles of both communal profiles. The default operation may, alternatively, cause only messages directed to the first communal profile and/or the second communal profile to be included in the consolidated message thread and/or to be displayed on devices associated with the user profiles of both communal profiles. The default operation may cause messages sent from a communal device associated with the first or second communal profiles to be included in the consolidated message thread and/or to be displayed on devices associated with the user profiles of both communal profiles.

The application and/or the remote system described herein may provide a range of additional, or alternative, functionalities to users. These functionalities may include transcribing audio messages for inclusion in the consolidated message thread, sending and receiving image data, including photographs and videos, and organizing messages in a consolidated message thread. The application and/or the remote system may also provide a filter than allows a user to display messages from and/or to a selected user profile participating in the communal message thread and determine that messages should be consolidated and/or added to a communal message thread based on the content of the messages.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for message thread consolidation. System 100 may include one or more processors. As used herein, a processor, such as processor(s) 102, 104, and/or 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 102, 104, and/or 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 102, 104, and/or 106 may possess its own local memory, which also may store program components, program data, and/or one or more operating systems.

System 100 may also include memory 108, 110, and/or 112. Memory 108, memory 110, and memory 112 may include volatile and nonvolatile memory, removable and non-removable media implemented in any method or technology for storage of information, such as computer-readable instructions, data structures, program component, or other data. Such memory 108, 110, and/or 112 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 108, 110, and/or 112 may be implemented as computer-readable storage media ("CRSM"), which may be any available physical media accessible by the processor(s) 102, 104, and/or 106 to execute instructions stored on the memory 108, 110, and/or 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 108, 110, and/or 112, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 114, network interface(s) 116, and network interface(s) 118 may enable communications between a first device 120, a second device 122, a third device 124, and a remote system 126, as well as other networked devices. Such network interface(s) can include one or more network interface controllers (NICs) or other types of transceiver devices to send and receive communications over a network.

For instance, each of the network interface(s) 114, network interface(s) 116, and network interface(s) 118 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 114, network interface(s) 116, and network interface(s) 118 may include a wide area network (WAN) component to enable communication over a wide area network. The network 128 may represent an array of wired networks, wireless networks, such as WiFi, or combinations thereof.

In some instances, the remote system 126 may be local to an environment associated the first device 120, the second device 122, and/or the third device 124. For instance, the remote system 126 can be located within the third device 124. In some instances, some or all of the functionality of the remote system 126 may be performed by one or more of the first device 120, the second device 122, or the third device 124.

In some instances, the remote system 126 is configured to store information indicating that a first user profile and a second user profile are associated with a communal device, such as the device 124. The device 124 may be disposed or otherwise located in a household, office, or other designated area. The remote system 126 may receive message data from the first device 120 associated with a first user 130 and/or a first user profile and/or a first user account. The message data may be directed to a second user 132 associated with a second user profile and/or account and/or the second device 122. The first user 130 and the second user 132 may be associated with a predetermined communal profile, such as a home group. The message data from the first user 130 may be an audio message corresponding to audio data that may be generated by at least one microphone 134 associated with the first device 120. The audio data may include data representing the user speech and other sounds, such as, for example, background noise.

In instances where the message data is an audio message, the remote system 126 may be configured to analyze the audio data to create a transcription of the user speech. For example, once the audio data is received from the first device 120, the portion of the audio data corresponding to the user speech may be separated from other components of the audio data, such as, for example, background noise. Automatic speech recognition (ASR) techniques may be used to generate text data representing the words making up the user speech. For example, ASR techniques may include generation of a list that includes the most likely words or phrases spoken by the user, an "N-best list" for example, and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings. Additional details regarding the use of ASR techniques is provided below with respect to FIG. 10.

The remote system 126 may be further configured to send the message data to a first user interface 136 of the first device 120. Sending the message data to the first user interface 136 may cause the first device 120 to display the message data, or a portion thereof, on the first user interface 136. In instances where the message data corresponds to an audio message, selection of the audio message or a "play" icon by the first user 130 may cause one or more speakers 138 to output the audio associated with the audio data.

The remote system 126 may be further configured to send the message data to a second user interface 140 of the second device 122. Sending the message data to the second user interface 140 may cause the second device 122 to display the message data, or a portion thereof, on the second user interface 140. In instances where the message data corresponds to an audio message, selection of the audio message or a "play" icon by the second user 132 may cause one or more speakers 144 to output the audio associated with the audio data. Additionally, or alternatively, the audio associated with the audio data may be output by a device, such as the third device 124, connected, via wired or wireless communication, to the second device 122. The third device 124 may output the audio upon receipt of the audio data by the second device 122, by selection of the "play" icon by the second user 132, by selection of the transcription by the second user 132, and/or by a command provided by the second user 132, such as, for example, an audible command. Additionally, in instances where the message data is not an audio message, the third device 124 may output audio corresponding to the message by, for example, synthesized speech.

In some instances, the remote system 126 may send the message data to the second device 122 based at least in part on an indication from the first user 130 that the message data is directed to or intended for the second user 132. The indication may include an instruction from the first device 120 to send the message data to the second device 122. The instruction may correspond to the user selecting the name of the second user 132 from a list of contacts and/or selecting a profile and/or account associated with the second user 132. The instruction may also correspond to the first user 130 speaking or otherwise entering a command to send the message data and/or to start a conversation with second user 132 and/or the second user's profile and/or account.

In some instances, the remote system 126 may send the message data to one or more other users that are associated with a predefined communal profile, such as a home group. The home group may be composed of user profiles and/or accounts that are associated with users in a family, and/or users residing in the same home or other location, and/or users that interact with a communal device, and/or users that have been selected for inclusion in the home group. The remote system 126 may send the message data to the communal profile based at least in part on an indication that the message is directed to the communal profile. The indication may include a predefined word or phrase, such as, for example "send to My Home Group." The indication may additionally, or alternatively, include sending of the message data from a communal device, such as the third device 124.

The remote system 126 may be further configured to receive, from one or more devices associated with a communal profile, second message data. The second message data may include audio message data, image message data, and/or textual message data. For example, the second message data may include audio message data sent from the second device 122. The audio message data may include user speech that is captured by one or more microphones 142 of the second device 122. The second message data may be sent to the communal profile, such as, in response to the first message data. In instances where the second message data includes audio message data, the remote system 126 may analyze second audio data generated by a microphone of the device, such as the microphone 142 of the second device 122, to generate text data representing a transcription of the second user speech. The remote system 126 may send the second message data to the first device 120, the second device 122, and any other devices indicated to be associated with the communal profile. The second message data may be linked, merged, or otherwise associated with the first message data into a consolidated message thread, such as a communal profile thread. At least a portion of the communal profile thread may be presented on the first user interface 136, the second user interface 140, and one or more other user interfaces corresponding to user devices associated with the communal profile. The portion of the communal profile thread may be presented instead of an individual thread representing the first message data and an individual thread representing the second message data.

Additionally, while the first message data and the second message data may be consolidated into the communal profile thread, one or more access controls may be implemented to control display and/or output of one or both of the first message data and the second message data. For example, while the first message data and the second message data may be consolidated into the communal profile thread, which may be accessible to each user profile of the communal profile, access to one or more messages in the thread may be controlled such that some messages, such as personal messages sent to a specific user profile in the communal profile, are accessible only to the specific user profile. By way of illustration, the first message data may be sent to a communal profile and may be accessible by each user and/or user account and/or user profile associated with the communal profile. However, the second message data, while in response to the first message data, may be intended for only the sender of the first message data and not the rest of the communal profile members. In this example, while the second message data may be consolidated with the first message data into the communal profile thread, the second message data may be only accessible by the user profile corresponding to the sender and the recipient of the second message data. Other user profiles of the communal profile may be restricted from viewing and/or hearing the second message data.

The determination to merge messages into a consolidated message thread may be based at least in part on a number of factors. For example, messages and associated message data may be consolidated into a message thread based on the sender and recipient user profiles of the messages being associated with a predefined communal profile. Additionally, or alternatively, the messages may be consolidated into a message thread based on the sender and/or the recipient user profiles being the communal profile. In some instances, a user-configurable setting may provide one or more users associated with a communal profile the ability to select default rules for determining whether message data should be included in a communal profile thread. For example, messages may be included in a communal profile thread when the sender and recipient user profiles are included in the same communal profile, which may be regardless of whether the communal profile is a sender or recipient. In other instances, messages may be included in a communal profile thread when the sender and/or recipient are the communal profile. In other instances, messages may be included in a communal profile thread when the content of the messages is similar and/or relevant to content of messages in a preexisting communal profile thread.

The factors used to determine whether to consolidate messages into a communal thread may also be based at least in part on the device used to send the message. For example, when message data is sent from a communal device, the corresponding message may be identified as being sent from the communal profile associated with the communal device. In other examples, the message data may be identified as being sent from the communal profile when the message data is sent from the communal device and the user sending the message data states that the corresponding message is from the communal profile instead of the user personally. In other examples, the message data may be identified as being sent to the communal profile when the message data is sent from the communal device. In other examples, the message data may be identified as being sent to the communal profile when the user states that the message data should be sent to the communal profile instead of an individual user profile of the communal profile. When no indication of recipient is provided by the user, the recipient may default to the communal profile in some examples. In other examples, the default may be for the communal device to query the user for an indication of the recipient, and upon receiving the indication, send the message to the indicated recipient. When message data is sent from a mobile device, instead of a communal device, the determination of whether to consolidate the message data into a communal profile thread may be based on, for example, whether the sender and recipient profiles are associated with the communal profile, and/or whether the sender indicates that the message data should be sent from the communal profile instead of the user profile individually, and/or whether the sender indicates that the message data should be sent to the communal profile, and/or whether the content of the message data is relevant or related to the communal profile thread.

The individual messages described herein as part of a consolidated message thread may be consolidated as follows. In some instances, files may be generated corresponding to the individual messages. Upon a determination that files should be consolidated into a message thread, the files may be associated with each other, such as in a list. The associated files may be utilized to display the message data together in the consolidated message thread. Additionally, or alternatively, the associated files may be introduced into a separate file corresponding to the consolidated message thread. In other instances, upon determining that a first file and a second file should be consolidated into a message thread, data of the first file may be introduced into the second file, and the first file may be deleted. Additionally, or alternatively, an instruction may be generated to control access to files corresponding to one or more messages such that only intended recipients may view and/or hear those messages even when the messages are consolidated into the message thread. Using the techniques described herein, message thread data may be generated and may include the message data corresponding to associated messages.

When messages are merged into the consolidated message thread as described herein, annotations may be provided to show a visual indication of who the sender and/or the recipient of the messages are. By way of illustration, My Home Group may have four users: Alvin, Bob, Calvin, and David. If Alvin sends a message to Bob, that message may be included in a communal profile thread based on one or more factors described herein, such as Alvin and Bob being associated with My Home Group. Display of the message in the My Home Group thread may include an annotation that the message is from Alvin's profile and is directed to Bob's profile. The message and the annotation may be displayed on one or more devices associated with the members of My Home Group, including, in some instances, Calvin and David. In some examples, when the message from Alvin's profile to Bob's profile is intended for only Bob to view, one or more access controls may restrict the other members of the communal profile, here Calvin and David, from viewing and/or accessing the message from Alvin's profile to Bob's profile. A visual indication that a particular message has associated access controls may be provided to the sender and/or recipient.

In addition to the annotations described herein, one or more notifications may be provided based at least in part on the sending and receipt of messages. Notifications may be user-configurable. For example, notification of receipt of a message between user profiles of a communal profile may only be provided to the user profile receiving the message and not the rest of the user profiles of the communal profile. In other examples, notification of receipt of a message between user profiles of a communal profile may be provided to each user profile, or selected user profiles, of a communal profile even if the user profiles are not designated as the recipient of the message. In other examples, notification of receipt of a message between user profiles of a communal profile may be provided when the communal profile is at least one of the recipients of the message.

Communal profiles, as described herein, may also be named or otherwise designated to assist in message thread consolidation and visualization of the same. In some instances, communal profiles may be named by one or more users associated with the communal profiles. In other examples, communal profile names may be determined from a relationship between communal profile members. For example, a group of users and/or user profiles associated with a communal device may be named Home Group or a similar designation. Additionally, or alternatively, when messages are sent and/or received between communal profiles, designation of each communal profile may differ depending on a relationship between the communal profile members. For example, a first communal profile may include user profiles corresponding to Alvin, Bob, and Carol, while a second communal profile may include user profiles corresponding to David, Ellen, and Frank. The first communal profile may be named based on a relationship between one of the users of the first communal profile and one of the users of the second communal profile. For example, if Alvin is the primary contact of at least one user in the first communal profile, the first communal profile may be designated as Alvin's Home to the second communal profile. Likewise, if Ellen is the primary contact of the second communal profile, the second communal profile may be designated as Ellen's Home to the first communal profile. This designation may differ among other communal profiles based on relationships with those profiles. For example, the second communal profile may be designated as Frank's Home to a third communal profile based at least in part on Frank being the primary contact with the third communal profile. The naming and designation conventions used herein may be user-configurable and/or alterable by one or more users of the communal profiles.

Additional messages may be received and sent between the first device 120, the second device 122, and one or more other devices associated with the communal profile.

In addition to the display of consolidated message threads, as described herein, the audio data corresponding to the messages associated with a consolidated message thread may also be output by one or more speakers associated with a communal device. In some instances, a user may interact with a communal device to hear messages that have been sent. For example, one or more user profiles of a communal profile may have sent message data to the communal profile and/or to an individual user profile of the communal profiles. A user may query the communal device to output audio associated with the messages. For example, the user may state "play messages to My Home Group." The communal device may retrieve messages from the consolidated message thread that are directed to My Home Group and output audio associated with those messages. Additionally, or alternatively, the user may state "play messages to Alvin." The communal device may retrieve messages from the consolidated message thread that are directed to Alvin only, to Alvin as part of My Home Group, and/or messages from a separate message thread to Alvin. The communal device, and/or the remote system, may determine an identity of the user and determine that the user is authorized to hear the requested messages before retrieving and/or outputting the requested messages.

Additionally, or alternatively, the memory 110 on the first device 120 may, when executed by the processor(s) 104, cause the processor(s) 104 to perform operations such as presenting the first user interface 136 on the first device 120. The operations may also include generating first message data based at least in part on input from a first user of the first device 120. The first message data may be directed to at least one user of a predefined communal profile, such as the home group described herein. The operations may further include receiving second message data from the second device 122, which may be associated with the second user 132. The second user 132 may be associated with the predefined communal profile. The operations may also include generating message thread data that includes the first message data and the second message data. Generating the message thread data may be based at least in part on an indicator associated with the first message data and second message data. In some instances, the indicator may be user directed, such as, for example, inclusion of a predefined word or phrase in the message data that the message data is directed to the predefined communal profile and/or selection of a communal profile from a list of contacts. Additionally, or alternatively, the indicator may be determined from the content of the first message data and the second message data. The content of the first message data and the second message data may be similar such that the remote system 126 determines that the first message data and the second message data are related. The operations may further include displaying a least a portion of the message thread data on the first user interface 136 of the first device 120. The operations may further include generating and/or utilizing one or more access controls for display of the first message data and/or the second message data when at least one of the messages is directed to a member of the predefined communal profile individually. The access controls may restrict access to the message data such that only the sender and/or the recipient may access the message data, even though the message data is included in the consolidated message thread.

Figure 2:
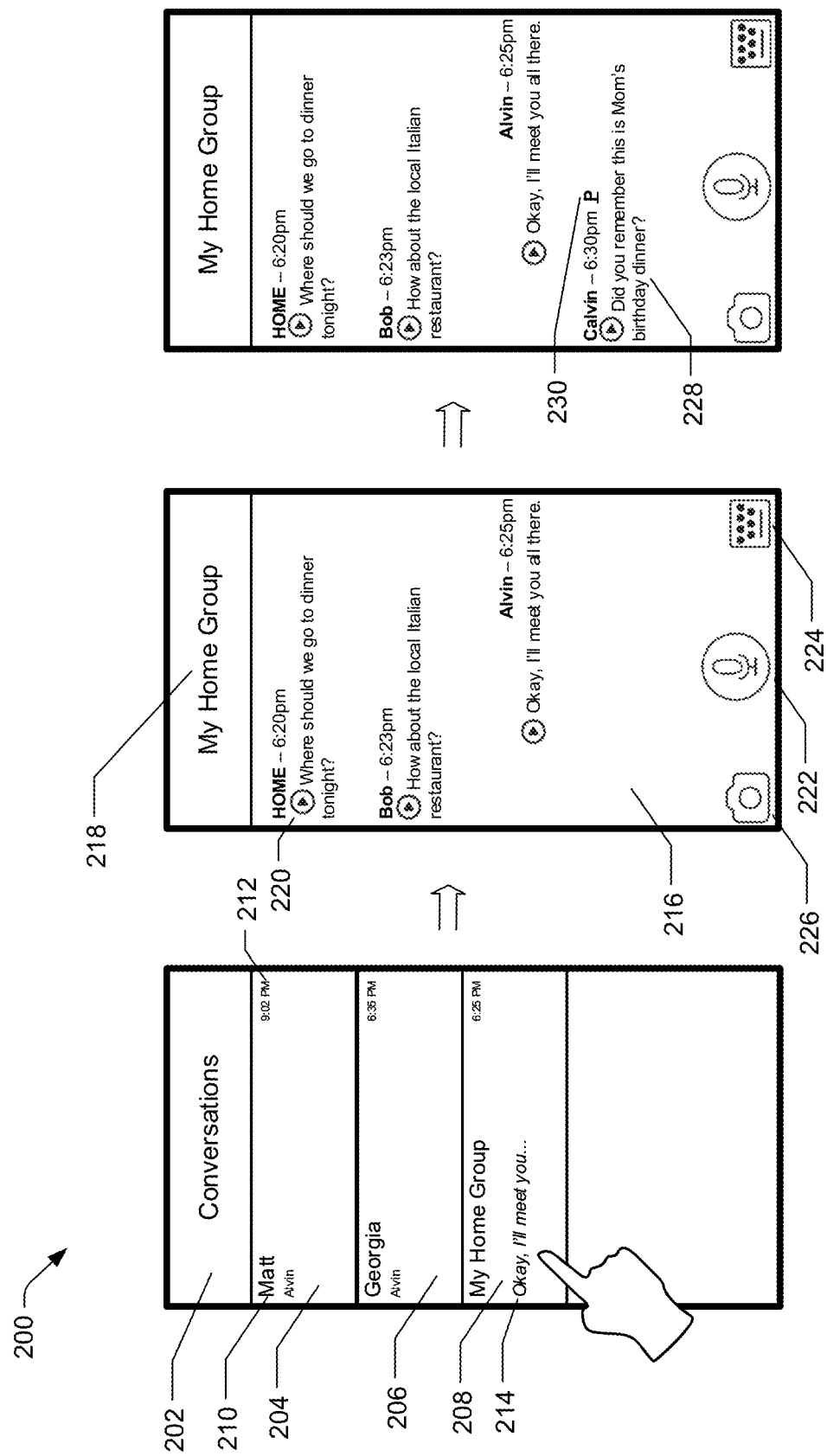
FIG. 2 illustrates an example user interface for the display of messages in a communal account, including access control functionality.

FIG. 2 illustrates an example user interface 200 for the display of consolidated message threads. The images of the user interface 200 as depicted in FIG. 2 represent a progression, from left to right, of changes to the user interface 200 as the user interacts with the user interface 200. The user interface 200 may be, for example, the user interface 136 and/or the user interface 140 from system 100. The user interface 200 may be displayed on a mobile device associated with a user and/or a user profile and/or a user account. The user interface 200 may include a conversations window 202, which may display one or more current and/or past conversations between the user and/or user profile of the mobile device associated with the user interface 200. While the examples described herein may describe one device as the sending device or one user or user profile as the sender, it should be appreciated that the device and user may both send and receive messages and message data as described herein. Additionally, when message data is described as being sent to and/or from a user, it should be appreciated that the message data may be sent to and/or from one or more user profiles associated with a user and/or one or more user accounts associated with a user. A user may be associated with more than one account, and each account may be associated with multiple profiles. The user profiles and/or user accounts may be associated with devices of the user, such as, for example, phones, computers, tablets, personal assistants, and/or communal devices such as voice-assistant devices.

As shown in FIG. 2, for example, the user interface 200 is associated with Alvin. The conversations window 202 includes three conversations: a first conversation 204 with a user profile corresponding to the user Matt; a second conversation 206 with a user profile corresponding to the user Georgia; and a third conversation 208 with a communal profile, My Home Group. In all or some of the conversations, such as the first conversation 204, the second conversation 206, and/or the third conversation 208, an indication 210 of who and/or which user profile or account the conversation is with may be displayed. A time of day 212 may also be displayed in association with the conversation(s). The time of day 212 may indicate when the last message in the message string for each conversation was sent and/or received.

The conversations 204, 206, and/or 208 may be displayed in the conversations window 202 in chronological order such that messages sent and/or received first in time appear at or near the top of the conversations window 202, while messages sent and/or received at later times may appear in chronological order under those messages sent and/or received first in time. As additional messages are sent and/or received, they may be displayed in chronological order at or near the bottom of the conversations window 202. Alternatively, the messages sent and/or received first in time may appear at or near the bottom of the conversations window 202, while messages sent and/or received at later times may appear in chronological order above those messages sent and/or received first in time. When conversations fill or substantially fill the conversations window 202, older messages may be pushed out of view in the conversations window 202. A user of the device displaying the conversations window 202 may view the older messages that have been pushed out of view by scrolling in the conversations window 202. The scrolling may be by touch input such as when the device includes a touchscreen, clicking on a scroll bar, scrolling by a mouse or other pointing device, and/or by providing a scrolling command to the device such as an audible command.

The user interface 200 may also include a preview or subject matter indicator 214 associated with one or more of the conversations displayed in the conversation window 202. The subject matter indicator 214 may include a portion of a message of the conversation. For example, as shown in FIG. 2, the subject matter indicator 214 states "Okay, I'll meet you . . . " This subject matter indicator 214 includes a portion of the last message sent in the My Home Group message thread. The subject matter indicator 214 may provide the user with a visual indication of the subject matter of the message thread. As shown in FIG. 2, each of the conversations 204, 206, and/or 208 may comprise a message thread.

The conversations displayed in user interface 200 may be selectable by a user of the device displaying the conversations window 202. Upon selection of a conversation, such as, for example, the third conversation 208, a messaging window 216 may be displayed in the user interface 200. The messaging window 216 may include one or more messages associated with the selected conversation. The messaging window 216 may include the name or a name indicator 218 at or near the top of the messaging window 216 to provide a visual indication of who the conversation is with. The name indicator 218 may be a shortened or abbreviated version of the name associated with the recipient and/or the recipient user profile. Message data associated with the conversation may be displayed, for example, under the name indicator 218 and may be displayed in chronological order.

The message data in the conversation may include various media types, such as, for example, textual message data, audio message data, textual data representing transcriptions of audio messages, image message data, textual data representing transcriptions of audio associated with image messages. The messages sent to the device displaying the user interface 200 may be displayed differently from messages sent from the device displaying the user interface 200. For example, as shown in FIG. 2, the messages sent to the device, the messages sent from profiles corresponding to HOME and Bob, may be displayed on one side of the user interface 200, whereas the messages sent from the device, the messages sent from the user profile corresponding to "Alvin" for example, may be displayed on an opposing side of the user interface 200. Additional differences between sent messages and received message may also be displayed, such as changes in text font, text size, italics, bolding, underlining, highlighting, and/or coloring.

When a message in the conversation is an audio message, textual data representing a transcription of the audio message may be displayed along with a symbol 220 displayed in close proximity to the transcription. The user of the device displaying the user interface 200 may select the transcription and/or the symbol 220, which may cause one or more speakers of the device to output audio corresponding to the audio message. Additionally, the user interface 200 may include functionality to allow the user associated with the device to compose and send messages. For example, a recording icon 222 may be presented, which when selected by the user, may cause one or more microphones of the device to capture audio, such as a spoken message from the user. The microphones may generate audio data corresponding to the captured audio. Automatic speech recognition may be used to generate text data corresponding to the audio data. The text data and/or audio data may be sent to one or more recipients and/or recipient user profiles.

Additionally, or alternatively, the user interface 200 may include a textual message composition icon 224, which when selected by the user, may provide a digital keyword for the user to compose a message with. The user may type a message, edit the text, and/or include one or more symbols or emojis and then send the message to the one or more recipients and/or recipient profiles.

Additionally, or alternatively, the user interface 200 may include an image message icon 226, which when selected by the user, may allow the user to select one or more images, such as pictures and/or videos, to be sent to the one or more recipients or recipient profiles. The image message icon 226 may also allow the user to take a picture and/or capture video for sending as a message. Combinations of audio, image, and textual messages may also be composed and/or or generated and sent.

Additionally, or alternatively, the user interface 200 may depict message data associated with one or more access controls. Access controls, as described herein, may be utilized when message data is sent from a user profile of a predefined communal profile that is incorporated into the consolidated message thread but is intended for one or more selected recipient profiles of the communal profile and not the communal profile as a whole. By way of example, as shown in FIG. 2, Alvin, Bob, and Calvin are associated with user profiles of a predefined communal profile, such as a home group. Alvin, Bob, and Calvin's user profiles are associated with the predefined communal profile based at least in part on the one or more factors described herein. In examples, messages sent by Alvin's profile, Bob's profile, Calvin's profile, and/or the communal profile to any user profile of the communal profile or to the communal profile may be consolidated into the communal profile message thread. However, one member of the communal profile may desire to send a message to one or more other selected members of the communal profile without sending that message to other members of the communal profile.

Using FIG. 2 as an example, the Home Group, which corresponds to the communal profile, sent the message "Where should we go to dinner?" Bob's response message was "How about the local Italian restaurant?", and Alvin replied "Okay, I'll meet you all there." Each of these messages was included in the group message thread and is accessible to each user profile of the communal profile. However, Calvin, another member of the communal profile, desires to send a message only to Alvin and not to the other members of the communal profile. Calvin may indicate his intent to send a message to a selected user profile of the communal profile by selecting Alvin's profile as the sole recipient profile when sending the message and/or by providing an audible command to the mobile device and/or the communal device from which Calvin is sending the message. Calvin's message may be included in the communal profile message thread using the factors discussed above, but given that Calvin has indicated that the message should be presented only to Alvin's profile, one or more access controls may be utilized to restrict access to other members of the communal profile. Continuing with the example from FIG. 2, Calvin sends a message and indicates that Alvin's profile should be the sole recipient profile. Given that Calvin, a member of the communal profile, is sending a message to another member of the communal profile, Calvin's message may be incorporated into the communal profile thread, but one or more access controls may be generated and/or utilized to restrict access to other members of the communal profile. The access controls may cause Calvin's message to be sent only to devices associated with Calvin and/or Calvin's profile. In other examples, Calvin's message may be sent to each device, user profile, and/or user account associated with the Home Group, but an instruction may also be sent to devices, profiles, and/or accounts not associated with Calvin and/or Calvin's profile that prevents Calvin's message from being accessed by other members of the communal profile.

An indication 230 that a message is sent with access controls may be presented on the sender and/or the recipient's device. For example, such messages may be presented in a different font, text size, and/or text color. In other examples, a symbol, such as "P," and/or a word, such as "Personal," may be presented in close proximity to the message data to indicate that the message data was not sent to the communal profile. When the recipient of a personal message sends a reply, the user may be prompted to indicate whether the reply should be sent to the communal profile as a whole or to the user profile that sent the personal message.

The access controls described herein may also include the ability for a head of household and/or administrator to circumvent the access controls to see messages in the consolidated message thread. This may provide the administrator with parental control options and/or oversight options for messages sent and/or received in the consolidated message thread.

Figure 3:
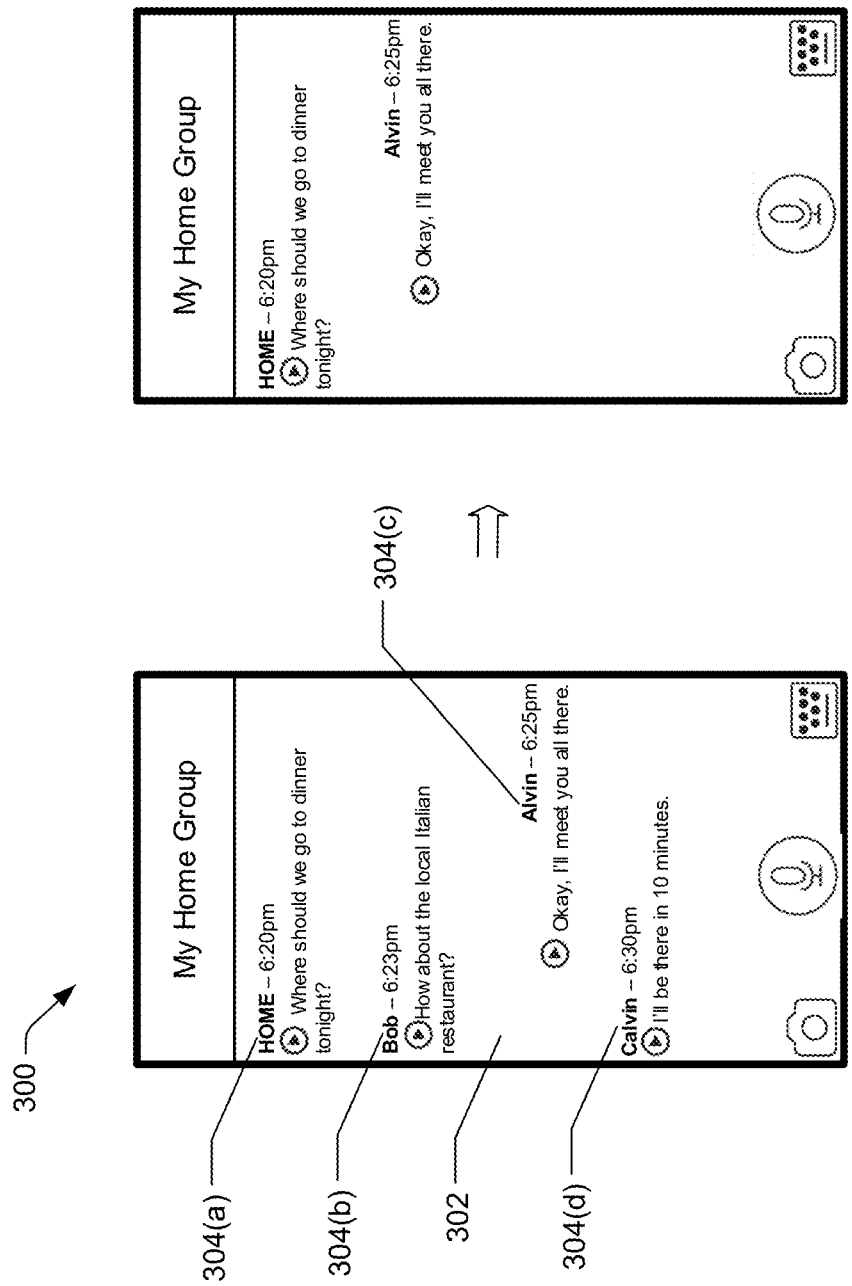
FIG. 3 illustrates an example user interface depicting filtered display of messages in a communal account.

FIG. 3 illustrates an example user interface 300 depicting filtered display of message thread data. The images of the user interface 300 as depicted in FIG. 3 represent a progression, from left to right, of changes to the user interface 300 as the user interacts with the user interface 300. The user interface 300 may include some or all the features of the user interface 200. For example, the user interface 300 may include a messaging window 302 that may include message data corresponding to one or more messages in a conversation along with an indication of the user and/or profile and/or account from which the messages are sent or received, a time the messages were sent or received, and one or more symbols that, when selected, cause audio associated with the message(s) to be output. The user interface 300 may also include functionality that may allow a user to filter or otherwise selectively display message data in the conversation. For example, a given message thread between multiple user profiles, such as user profiles assigned and/or associated with a communal profile, may contain a large number of messages. Those messages may be to certain individual profiles in the communal profile, from certain individual profiles in the communal profile, to the communal profile as a whole, from the communal profile as a whole, and/or combinations thereof. However, a user, such as Alvin for example in FIG. 3, may desire to only display a subset of the message data in the message thread.

For example, Alvin may desire to display only those messages sent from Alvin's profile and those messages sent by the communal profile. The user, here Alvin, may selectively display message data in this way by, for example, selecting one or more of the name indicators 304(a)-(304(d) displayed in the messaging window 302. An options menu may appear, which may allow the user to select which of the messages to display. Additionally, or alternatively, display of icons near the name indicators 304(a)-304(d) may be selectable by the user to indicate which messages to display. Additionally, or alternatively, a user may swipe a portion of the screen associated with display of a name indicator and/or message data, which may present a menu of options that includes filtering. The user may select the filtering option and select which sender and/or recipient messages to view on the user interface 300. Additionally, or alternatively, the user may provide a command, such as an audible command, to the device or a communal device. The command may specify which messages to be displayed, and/or which recipients and/or recipient profiles for which to display messages, and/or which senders and/or sender profiles for which to display messages. Upon selection of the messages to be displayed, messages that have not been selected may be removed from the user interface 300, leaving the selected messages. A user may unselect or otherwise undo the filtering described herein such that all messages in the message thread are included in the messaging window 302.

Figure 4:
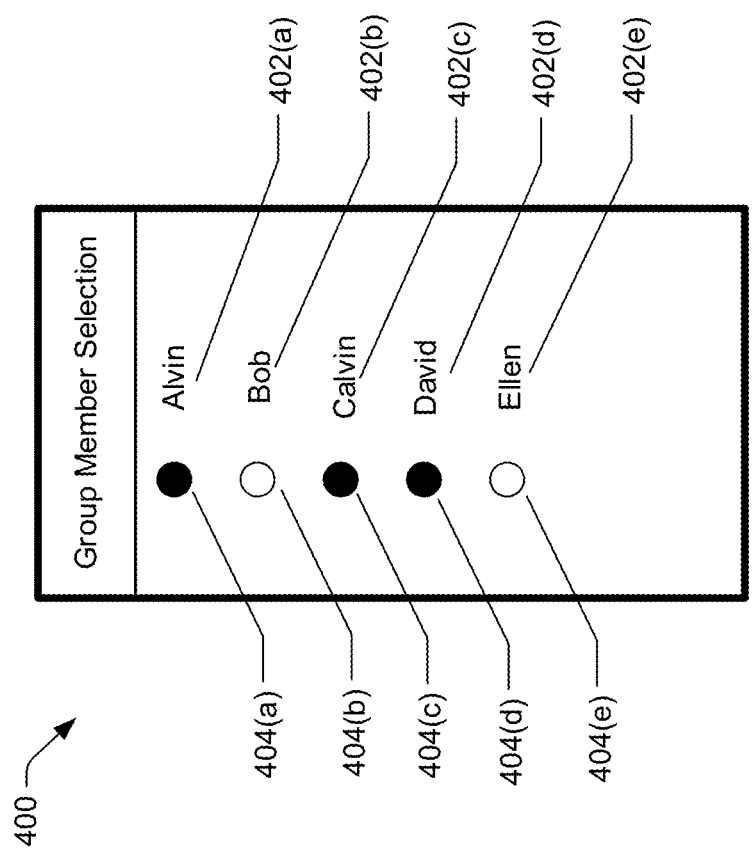
FIG. 4 illustrates an example user interface depicting selection of user profiles associated with a communal profile.

FIG. 4 illustrates an example user interface 400 depicting selection of users and/or user profiles in a communal profile. One or more user names and/or name indicators 402(a)-402(e) may be displayed on the user interface 400. The user names and/or name indicators 402(a)-402(e) may correspond to one or more user profiles and/or accounts from a contacts list available to the user interface 400 and/or from contacts that have corresponded with the user in the past. Selection icons 404(a)-404(e) may be displayed in proximity to the name indicators 402(a)-402(e). The icons 404(a)-404(e) may be selected and/or deselected by the user to determine which users are associated with a given communal profile, such as a home group. Additionally, or alternatively, the users associated with a communal profile may be users indicated to be family members, which may be determined from user input and/or determined by the device or remote system based on the content of messages sent and/or received between the user profile and other user profiles. For example, a message from the user profile may include words that indicate familial relationships such as "mom," "dad," "son," "daughter," "sister," and other similar words.

Additionally, or alternatively, the user profiles associated with the communal profile may correspond to profiles and/or accounts that are associated with a communal device, such as a voice-assistant device. The communal device may correspond to a home device that is used by multiple users and/or user profiles in a home or other environment. The user profiles may be associated with the communal device by, for example, a user-configurable setting that may allow users to select a communal device to be associated with. The user profiles may also be associated with the communal device by, for example, a determination that the users associated with the user profiles commonly interact with the communal device. For example, users that interact with the communal device more than a threshold number of times in a given time span may be associated with the device. The given time span may be a number of minutes, days, weeks, or months. An identity of the users may be determined by analyzing audio data corresponding to audio from the users as captured by one or more microphones of the communal device. The identity of the users may also be used to determine which user profile is sending messages, when sent from the communal device. It should be understood that more than one communal device may be located in a home or other environment. In these instances, the multiple communal devices may be associated with each other and may be associated, collectively, with a given location, such as a home and/or office.

Figure 5:
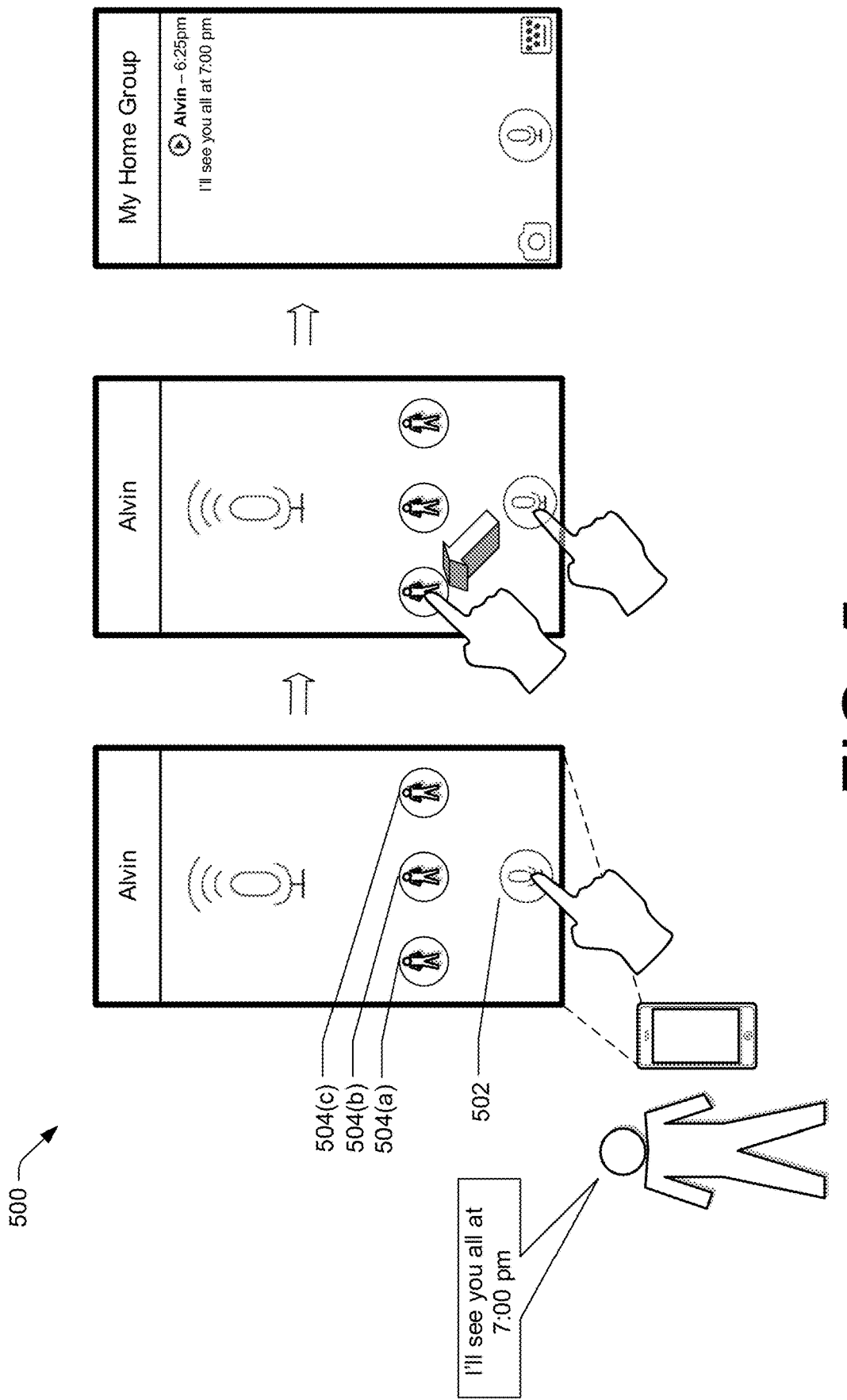
FIG. 5 illustrates an example user interface depicting recording of audio to be sent as a message and selection of a recipient.

FIG. 5 illustrates an example user interface 500 depicting recording of audio to be sent as a message and selection of a recipient profile. The images of the user interface 500 as depicted in FIG. 5 represent a progression, from left to right, of changes to the user interface 500 as the user interacts with the user interface 500. The user interface 500 may include a recording icon 502 that, when selected by a user, may initiate the capturing of audio by one or more microphones of a user device. Selection of the recording icon 502 may cause the one or more microphones to capture audio from the user and generate audio data corresponding to the captured audio. As shown in FIG. 5, selection of the recoding icon 502 may be initiated by a user pressing on a portion of the screen displaying the recording icon 502.

Recording of audio may commence when the user presses the recording icon 502, and recording may continue for as long as the user maintains contact with the portion of the screen associated with the recording icon 502, such as by pressing and holding the portion of the screen associated with the recording icon 502. Alternatively, recording of audio may commence when the user presses and releases the portion of the screen associated with the recording icon 502, and recording may continue until the user presses and releases the portion of the screen associated with the recording icon 502 a second time. Alternatively, or additionally, recording of audio may commence when the user provides a command, such as an audible command, to the device to commence recording, and recording may continue until the user provides a command to stop recording. Textual or audio clues may be provided to the user to instruct the user on how to record audio. For example, in the instance where recording of audio commences when the user presses and holds the portion of the screen associated with the recording icon 502, a textual clue such as "press and hold to record voice message" may be displayed. The textual clue may be provided when the user engages with the user interface 500 in a way that shows an intent to record a message, such as, for example, if the user presses but releases the portion of the screen associated with the recording icon 502.

When a user has finished recording an audio message, the user may indicate which contact(s) and/or group(s) to send the message to. For example, one or more contact indicators 504(a)-504(c) may be displayed near the recording icon 502 on the user interface 500. The contact indicators 504(a)-504(c) may include one or more of contact names, name indicators, symbols, photographs, videos, and/or avatars that represent the contacts and their corresponding user profiles. The user may indicate which contact(s) to send the message to by, for example, sliding the user's finger along the screen displaying the user interface 500 to one or more of the contact indicators 504(a)-504(c). A visual indication that a contact has been selected by, for example, changing the color of the contact indicator, outlining the contact indicator, or providing textual, audible, and/or tactile confirmation and/or an animation to the user. In some instances, the contact indicators 504(*a*)-504(*c*) may be displayed radially on the user interface 500.

While three contact indicators 504(*a*)-504(*c*) are depicted in FIG. 5, any number of contact indicators may be displayed and/or made available. For example, when numerous contacts may be chosen by the user, some indicators may be displayed on the user interface 500 while others are made available for display and selection. The user may position his or her finger at or near the edge of the screen, which may provide an indication that the user desired to see additional contact indicators. Additional contact indicators may be presented, such as in a scrolling manner, while or after the user's finger is located at or near the edge of the screen. When the user sees the desired contact indicator, the user may move his or her finger away from the edge of the screen, causing the scrolling of contacts to cease and allowing the user to slide his or her finger to the desired contact indicator.

Display of the contact indicators 504(*a*)-504(*c*) may be determined through various means. In some instances, the contact indicators may be in alphabetical order such that the contact indicators start with names, whether last name, first name, or business name, beginning with the letter "A." In other instances, the contact indicators may be in chronological order such that contacts that have corresponded with the user most recently are displayed first, followed by contacts that have corresponded with the user less recently. In other instances, when the user is responding to one or more messages in a communal message thread, other user profiles of the communal profile may be displayed before user profiles that are not associated with the communal profile. One or more of the contact indicators may correspond to a predefined communal profile, such as a home group, to which the user is associated with.

In instances where a communal message thread has been created, selection of a contact indicator may determine whether the message from the user should be included in the communal message thread or if the message is to be sent to one of the user profiles of the communal profile individually. For example, Alvin, Bob, and Carol may belong to a communal profile that has been messaging each other as a group. Alvin, for example, may desire to send a message to all of the user profiles in the communal profile by selecting a contact indicator that corresponds to his or her communal profile. Alvin may, alternatively, desire to send a separate message to, for example, Bob's profile and not to the rest of the user profiles of the communal profile. In such an instance, Alvin may select a contact indicator associated with Bob's profile and not with the communal profile. Doing so may cause Alvin's message to not be incorporated in the communal thread, or, Alvin's message may be incorporated in the communal thread and one or more access controls may be generated or utilized to restrict access to Alvin's message such that only Alvin's profile and Bob's profile can view and/or hear the message. In some instances, a user may refrain from making a selection from the contact indicators. In these instances, the device and/or the remote system may determine a default recipient to send the message to. For example, if the user was engaged in a conversation with his or her communal profile, the device and/or system may determine that the user's intent was to send the message to the communal profile.

Once the user records his or her message and a contact indicator is chosen, the audio data is transcribed to generate text data. The text data and/or the audio data is sent to the chosen recipient profile(s). In the instance where the chosen recipient profile is the communal profile, the text data and/or audio data is sent to devices associated with the user profiles of the communal profile. If the message is associated with one or more additional messages that were previously sent, the message is merged into the message thread that includes the additional messages and displayed as such on user interfaces of the communal members' devices.

Figure 6:
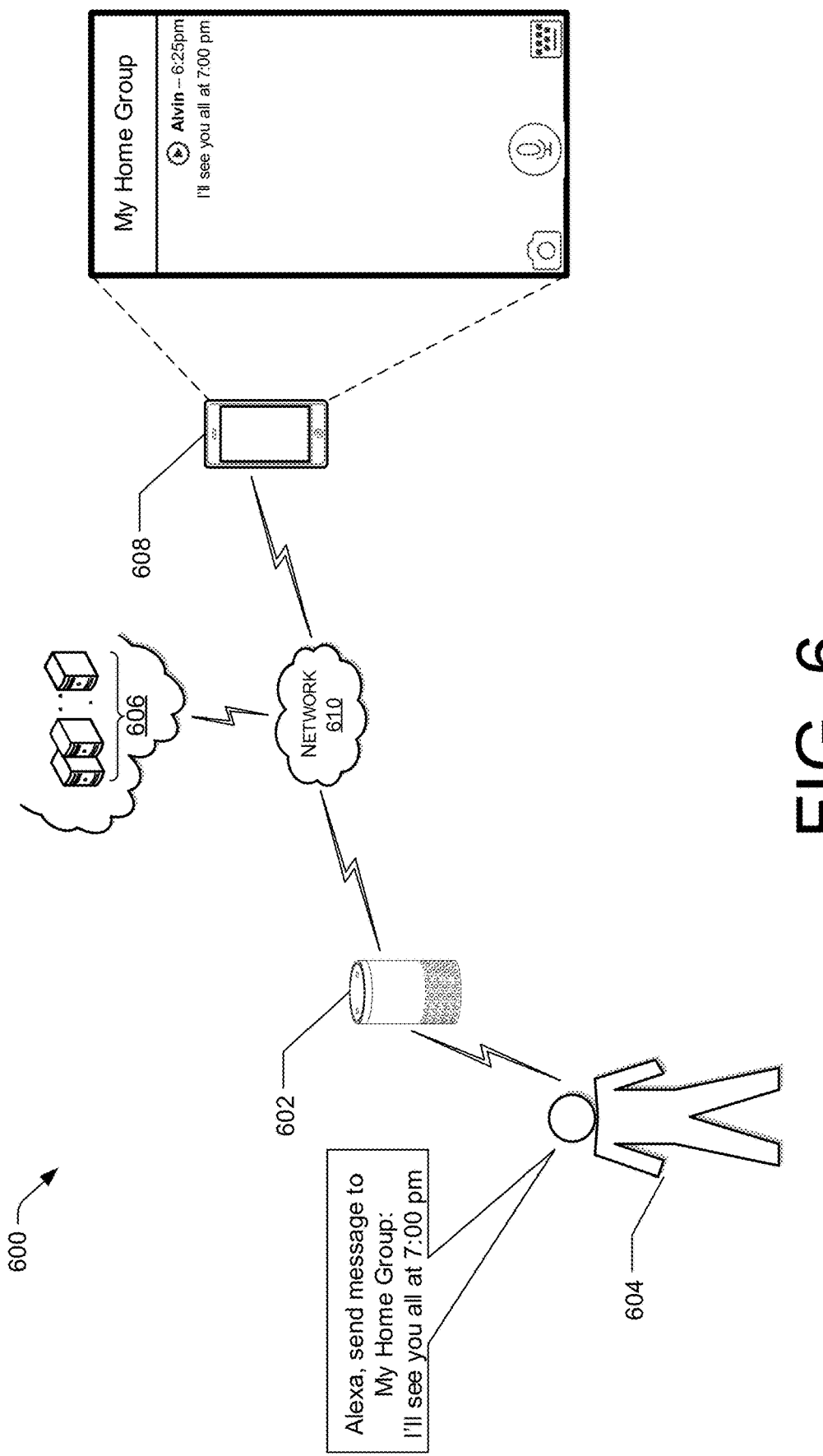
FIG. 6 illustrates a schematic diagram for sending message data via a communal device.

FIG. 6 illustrates a schematic diagram 600 for the sending of message data via a communal device. As described herein, one method by which a user may send message data may be via a communal device, such as a voice-assistant device. The communal device 602 may include one or more microphones that may capture audio from a surrounding environment. The audio from the environment may include user speech. The one or more microphones may capture the user speech and generate corresponding audio data. Automatic speech recognition techniques may be used to generate text data that corresponds to the user speech. Natural language understanding techniques may be used to determine an intent of the user, such as an intent to send a message. The automatic speech recognition techniques and natural language understanding techniques are further described below with respect to FIG. 10. As illustrated in FIG. 6, a user 604 says "Alexa, send message to My Home Group: I'll see you all at 7:00 pm." In this example, a wake word or predefined word or phrase, here "Alexa," may cause the communal device 602 and/or a remote system 606 to utilize user speech following the wake word to perform automatic speech recognition and natural language understanding.

The one or more microphones of the communal device 602 may capture audio corresponding to the user speech, generate corresponding audio data, perform automatic speech recognition and natural language understanding on the audio data, and determine a user intent. In this example, the phrase "send message to My Home Group," signifies a user intent to send a message from the communal device 602 to one or more devices 608 associated with members of the group My Home Group and/or those members' profiles and/or accounts. The communal device 602 and/or the remote server 606 may determine that the user speech following the phrase "send message to My Home Group" includes the message to be sent. In this example, the message is "I'll see you all at 7:00 pm." The communal device 602 and/or the remote server 606 may generate an audio file that contains the user speech corresponding to the message, and the communal device 602 and/or the remote server 606 may generate text data representing a transcription of the audio data. The communal device 602 and/or the remote server 606 may send the message data to the recipient profile, My Home Group in this example, to be displayed on one or more devices 608 associated with the recipient profile. The communal device 602 and/or the remote server 606 may determine that the message is associated with one or more previous messages to or from the user profile. Based at least in part on the determination that the message is associated, the communal device 602 and/or the remote server 606 may generate message thread data that contains the message and the previous messages. Alternatively, the communal device 602 and/or the remote server 606 may include the message in a preexisting message thread based on the determination that the message is associated with the messages in the preexisting message thread. The message may be sent via a network 610, as described more fully with respect to FIG. 1, to the remote server 606 and/or the one or more devices 608.

The user interfaces, such as user interfaces 200-600, may include additional symbols, text, windows, and features to facilitate messaging between users and user profiles. The additional features may include a number of other visual indicators of the number of unread messages in a conversation. The additional features may include display of icons that indicate one or more error states. For example, if a message fails to be sent and/or delivered to a recipient, an indication may be displayed to indicate this failure. The indication may be text that states, for example, "Not delivered." The text may also be presented in a different color from some or all other text in the user interface. The user may be prompted to attempt resending the message and/or the message may be resent automatically periodically until delivered successfully. The indication of message failure may be removed if and/or when the message is successfully sent. Additionally, or alternatively, when a user indicates that one or more messages should be deleted, an error message may be displayed if the message cannot be deleted. The error message may prompt the user to try deleting the message at a later time. Additionally, or alternatively, when a user records an audio message, a transcription may be generated as discussed herein. If, however, an error occurs and the transcription is not available, the user may be presented with an indication of the error, such as, for example, text displayed in place of the transcription. The text may state "Text Not Available," and/or "Voice Message."

Figure 7:
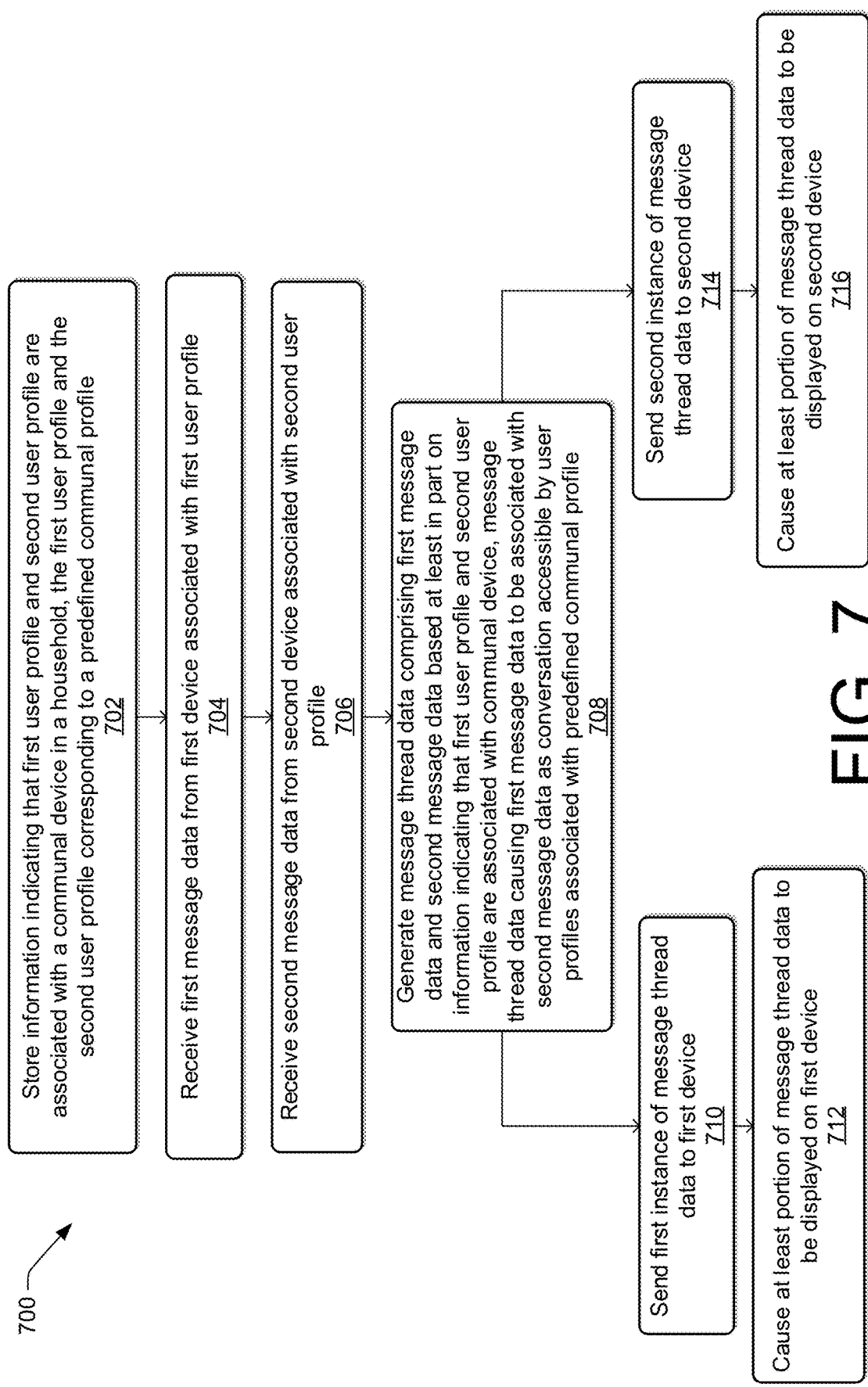
FIG. 7 illustrates a flow diagram of an example process for consolidating message threads within a communal profile.

FIG. 7 illustrates a flow diagram of an example method 700 for consolidating message threads. Method 700 is illustrated as a logical flow graph. The order in which the operations or steps are described is not intended to be construed as a limitation, and any number of the described operations may be combined in any order and/or in parallel to implement method 700.

At block 702, the method 700 may include storing information indicating that a first user profile and a second user profile are associated with a communal device. In some examples, the communal device may be disposed in a household, an office, or another designated location. The first user profile and the second user profile may correspond to a predefined communal profile. In some instances, the predefined communal profile may include user profiles associated with the same family, user profiles corresponding to users residing in the same location, such as a home, user profiles corresponding to users selected to be in the predefined communal profile, and/or user profiles associated with the communal device. The first user profile and/or the second user profile being associated with the predefined communal profile may be based on one or more factors. The factors may include a designation by users sending and/or receiving the first and second messages that the messages are directed to the predefined communal profile. The factors may additionally, or alternatively, include a determination that the sender and the recipient of the first and second messages are members of the predefined communal profile. The factors may additionally, or alternatively, include a determination that the content of the first and second messages are relevant and/or related to each other. The factors may additionally, or alternatively, include a determination that the first message and/or the second message were sent to and/or from a communal device. The factors may additionally, or alternatively, include a determination that the first message and the second message include a predefined word and/or phrase indicating that the messages are associated.

At block 704, the method 700 may include receiving first message data from a first device associated with the first user profile. The first user profile may be associated with a first user and/or user account of the predefined group of users. The first message data may be received over a network. The network may represent an array of wired networks, wireless networks, such as WiFi, or combinations thereof. In some instances, the remote system may be local to an environment associated the first device.

At block 706, the method 700 may include receiving second message data from a second device associated with the second user profile. The second user profile may be associated with a second user and/or user account of the predefined communal profile. The second message data may be directed to at least one user profile of the predefined communal profile. In examples, the second message data may be directed to a different user profile than the first message data, or the first and second message data may be directed to the same user profile, such as a third user profile or a communal profile. The second message may be received over a network, which may be similar to the network described above at block 704.

At block 708, the method 700 may include generating message thread data comprising the first message data and the second message data based at least in part on the information indicating that the first user profile and the second user profile are associated with the communal device. The message thread data may cause the first message data to be associated with the second message data as a conversation accessible by user profiles associated with the predefined communal profile. In some instances, a file may be generated corresponding to the first message data and a file may be generated corresponding to the second message data. Generating the message thread data may include associating the files with each other, such as in a list. The associated files may be utilized to display the message data together as the message thread data. Additionally, or alternatively, the associated files may be introduced into a separate file corresponding to the message thread data. In other instances, upon determining that the files corresponding to the message data should be consolidated into message thread data, data of one file may be introduced into the other file, and the first file may be deleted.

At block 710, the method 700 may include sending a first instance of the message thread data to the first device. Sending the first instance of the message thread data to the first device may be performed over the networks and via the network interfaces described herein.

At block 712, the method 700 may include causing at least a portion of the message thread data to be displayed on a first user interface of the first device. The portion of the message thread data may include a naming designation for the message thread data, such as a community profile name. The portion of the message thread data may also include a time that a most recent message in the message thread data was sent and/or received. The portion of the message thread data may also include a portion of a message from the message thread data, such as a portion of the latest message that was sent or received. An indication may be received that the portion of the message thread data has been selected by a user of the first device. Based at least in part on the indication, the first message and the second message, along with other messages in the message thread, if any, may be displayed on the user interface of the first device. Display of the first message data and the second message data may include an annotation showing the sender and/or recipient of one or more messages in the message thread data, a time that the messages were sent and/or received, text associated with the messages, and one or more symbols representing audio data associated with the messages. As additional message data is determined to be associated with the message thread data, that additional message may be merged, linked, or otherwise added to the message thread data and displayed, such as in chronological order.

At block 714, the method 700 may include sending a second instance of the message thread data to the second device. Sending the second instance of the message thread data to the second device may be performed over the networks and via the network interfaces described herein.

At block 716, the method 700 may include causing at least a portion of the message thread data to be displayed on a second user interface of the second device. The portion of the message thread data may include a naming designation for the message thread data, such as a communal profile name. The portion of the message thread data may also include a time that a most recent message in the message thread data was sent and/or received. The portion of the message thread data may also include a portion of a message from the message thread data, such as a portion of the latest message that was sent or received.

In some examples, one or more access controls may limit the message data that is displayed on the first device and/or the second device. For example, while the first message data and the second message data may be consolidated into the communal profile thread, which may be accessible to each member of the communal profile, access to one or more messages in the thread may be controlled such that some messages, such as personal messages sent to a specific user and/or a specific user profile associated with the communal profile, are accessible only to the specific user and/or profile. By way of illustration, the first message data may be sent to a communal profile and may be accessible by each user and/or user account and/or user profile associated with the communal profile. However, the second message data, while in response to the first message data, may be intended for only the sender of the first message data and not the rest of the communal profile members. In this example, while the second message data may be consolidated with the first message data into the communal profile thread, the second message data may be only accessible by the sender and the recipient of the second message data. Other members of the communal profile may be restricted from viewing and/or hearing the second message data.

Figure 8:
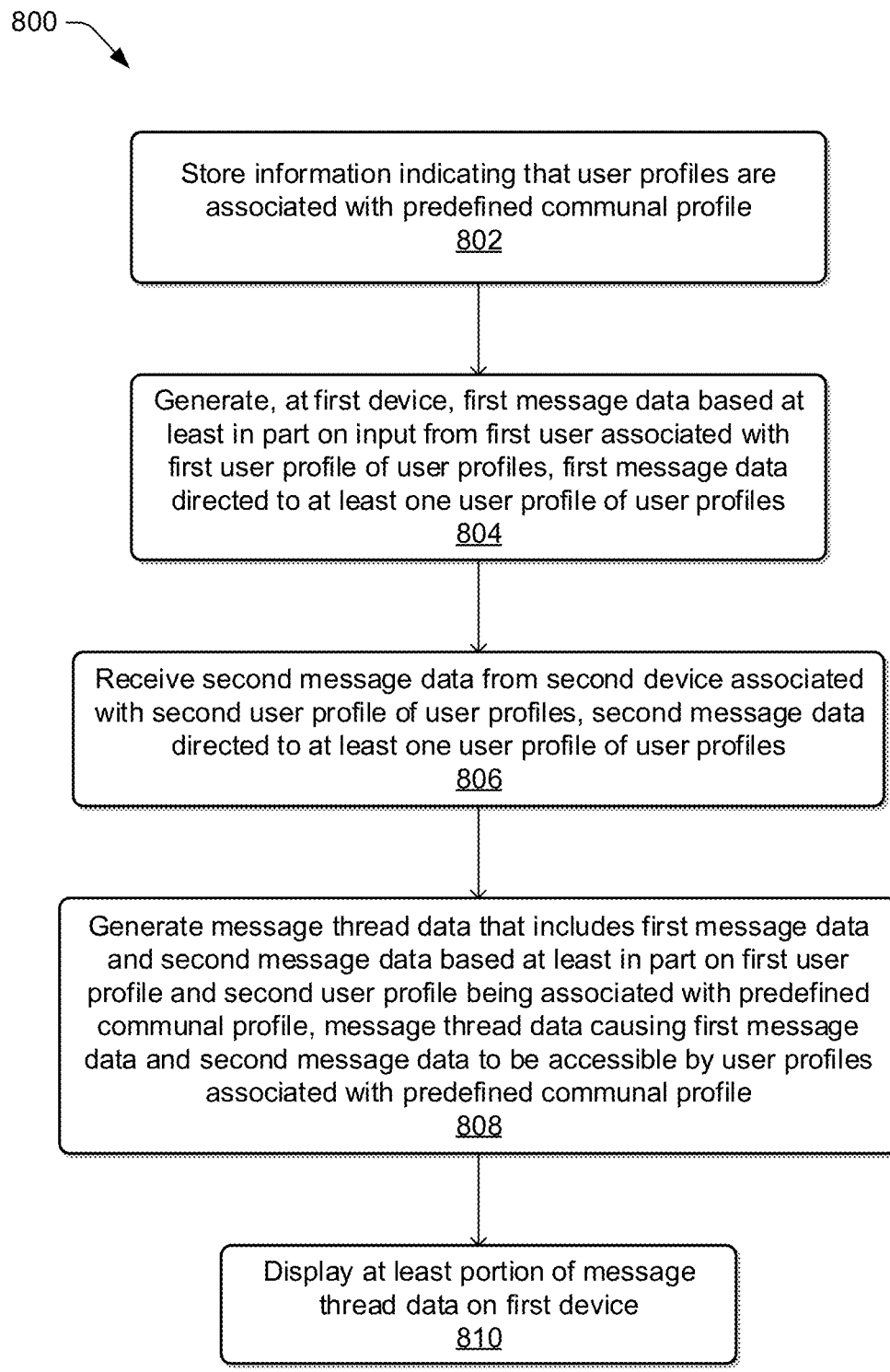
FIG. 8 illustrates a flow diagram of another example process for consolidating message threads with a home group profile.

FIG. 8 illustrates a flow diagram of another example method 800 for consolidating message threads. Method 800 is illustrated as a logical flow graph. The order in which the operations or steps are described is not intended to be construed as a limitation, and any number of the described operations may be combined in any order and/or in parallel to implement method 800.

At block 802, the method 800 may include storing information indicating that user profiles are associated with a predefined communal profile. The predefined communal profile may be associated with a communal device. In some examples, the communal device may be disposed in a household, an office, or another designated location. In some instances, the predefined communal profile may include user profiles associated with the same family, profiles associated with users residing in the same location, such as a home, users selected to be in the predefined communal profile, and/or users associated with a communal device. The user profiles may be associated with the communal profile based on one or more factors. The factors may include a designation by users sending and/or receiving messages that the messages are directed to the communal profile. The factors may additionally, or alternatively, include a determination that the sender and the recipient of messages are members of a communal profile. The factors may additionally, or alternatively, include a determination that the content of messages are relevant and/or related to each other. The factors may additionally, or alternatively, include a determination that the messages were sent to and/or from a communal device. The factors may additionally, or alternatively, include a determination that the messages include a predefined word and/or phrase indicating that the messages are associated.

At block 804 the method 800 may include generating, at a first device, first message data based at least in part on input from a first user associated with the first user profile. The first message data may be directed to at least one other user profile of the user profiles, such as a second user profile associated with a second device. Generation of the first message data may be performed via one or more microphones capturing audio from a surrounding environment. The audio from the environment may include user speech. The one or more microphones may capture the user speech and generate corresponding audio data. Automatic speech recognition techniques may be used to generate text data that corresponds to the user speech. In some instances, natural language understanding techniques may be used to determine an intent of the user, such as an intent to send a message. A wake word or predefined word or phrase may cause the device and/or the remote system to utilize user speech following the wake word to perform automatic speech recognition and natural language understanding. The one or more microphones may capture audio corresponding to the user speech, generate corresponding audio data, perform automatic speech recognition and natural language understanding on the audio data, and determine a user intent. The user intent may be to send a message to a recipient, such as one or more members of a communal profile and/or those members' profiles and/or accounts. The audio data may also contain the message to be sent. An audio file may be generated that contains the user speech corresponding to the message, and the device and/or a remote server may generate text data representing a transcription of the audio data.

At block 806, the method 800 may include receiving second message data from the second device associated with the second user profile of the user profiles. The second message data may be directed to at least one user profile of the user profiles. The second message data may be received over the network(s) and via the network interface(s) described herein.

At block 808, the method 800 may include generating message thread data that includes the first message data and the second message data. Generating the message thread data may be based at least in part on the first user profile and the second user profile being associated with the predefined communal profile. The message thread data may cause the first message data and the second message data to be accessible by user profiles associated with the predefined communal profile. Additionally, or alternatively, generating the message thread data may be based at least in part on an indicator associated with the first message data and the second message data. The indicator associated with the first message data and the second message data may include a designation by users sending and/or receiving the first and second message data that the message data is directed to a communal profile. The indicator may additionally, or alternatively, include an indication that the sender and the recipient of the first and second messages are members of the communal profile. The indicator may additionally, or alternatively, include an indication that the content of the first and second message data is relevant and/or related to each other. The indicator may additionally, or alternatively, include a determination that the first message data and/or the second message data were sent to and/or from a communal device. The indicator may additionally, or alternatively, include an indication that the first message data and the second message data include a predefined word and/or phrase indicating that the first message data is associated with the second message data.

Generating the message thread data may include associating files representing the first message data and the second message data with each other, such as in a list. The associated files may be utilized to display the message data together as the message thread data. Additionally, or alternatively, the associated files may be introduced into a separate file corresponding to the message thread data. In other instances, upon determining that the files corresponding to the message data should be consolidated into message thread data, data of one file may be introduced into the other file, and the first file may be deleted.

At block 810, the method 800 may include displaying at least a portion of the message thread data on the first device. The portion of the message thread data may include a naming designation for the message thread data, such as a communal profile name. The portion of the message thread data may also include a time that a most recent message in the message thread data was sent and/or received. The portion of the message thread data may also include a portion of a message from the message thread data, such as a portion of the latest message that was sent or received. An indication may be received that the portion of the message thread data has been selected by a user of the first device. Based at least in part on the indication, the first message data and the second message data, along with other message data in the message thread data, if any, may be displayed on the first device. Display of the first message data and the second message data may include an annotation showing the sender and/or recipient of the message data, a time that the message data was sent and/or received, text associated with the message data, and/or one or more symbols representing audio data associated with the message data. As additional messages are determined to be associated with the message thread data, those additional messages may be merged, linked, or otherwise added to the message thread data and displayed, such as in chronological order.

In some examples, one or more access controls may limit the message data that is displayed on the first device. For example, while the first message data and the second message data may be consolidated into the communal profile thread, which may be accessible to each member of the communal profile, access to one or more messages in the thread may be controlled such that some messages, such as personal messages sent to a specific user and/or a specific user profile in the communal profile, are accessible only to the specific user and/or profile. By way of illustration, the first message data may be sent to a communal profile and may be accessible by each user and/or user account and/or user profile associated with the communal profile. However, the second message data, while in response to the first message data, may be intended for only the sender of the first message data and not the rest of the communal profile members. In this example, while the second message data may be consolidated with the first message data into the communal profile thread, the second message data may be only accessible by the sender and the recipient of the second message data. Other members of the communal profile may be restricted from viewing and/or hearing the second message data.

Figure 9:
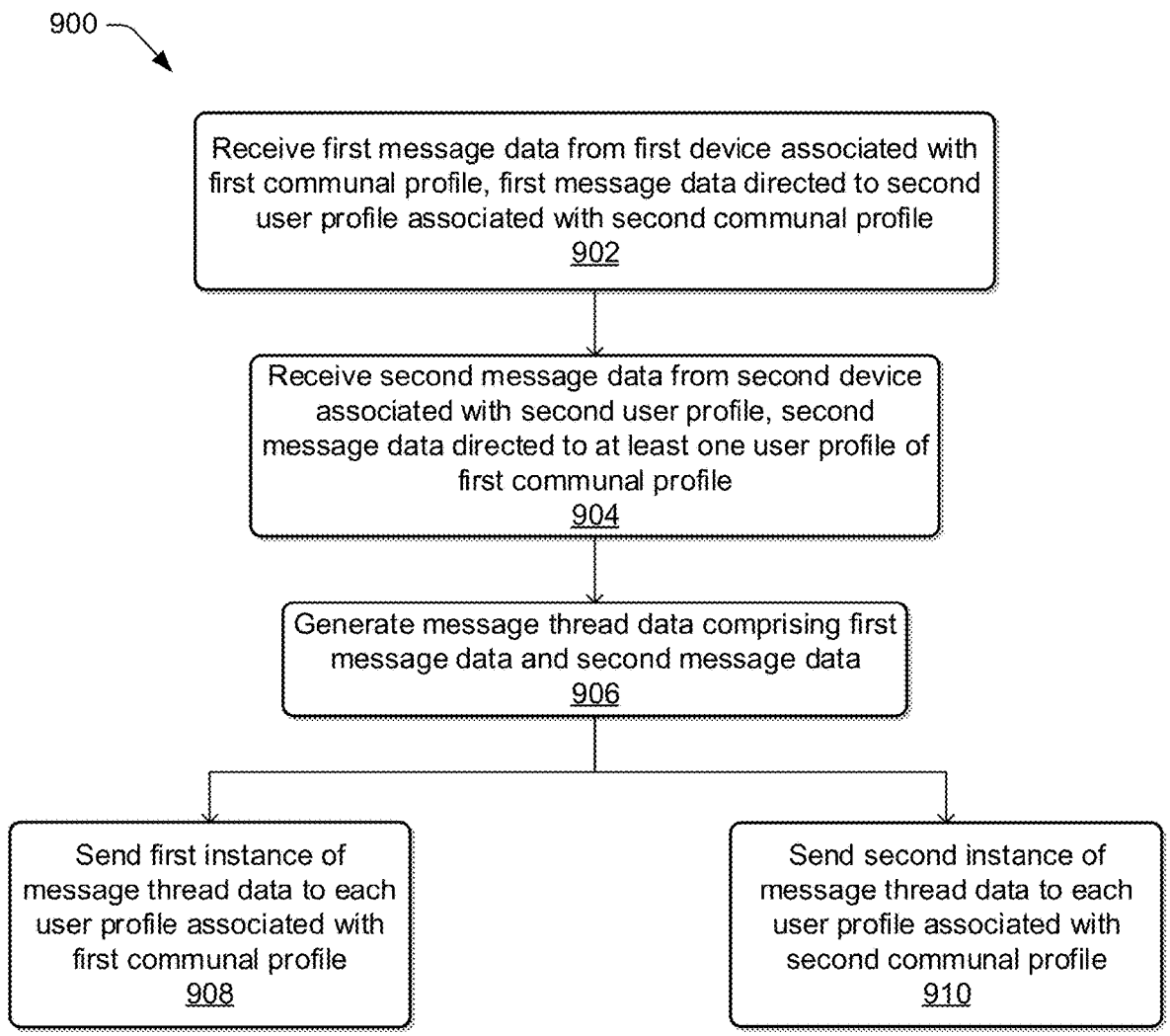
FIG. 9 illustrates a flow diagram of an example process for consolidating message threads between communal profiles.

FIG. 9 illustrates a flow diagram of an example method 900 for consolidating message threads. Method 900 is illustrated as a logical flow graph. The order in which the operations or steps are described is not intended to be construed as a limitation, and any number of the described operations may be combined in any order and/or in parallel to implement method 900.

At block 902, the method 900 may include receiving first message data from a first device associated with a first communal profile. The first message data may be directed to a second user profile associated with a second communal profile. The first message data may be received over a network. The network may represent an array of wired networks, wireless networks, such as WiFi, or combinations thereof. In some instances, the remote system may be local to an environment associated the first device.

At block 904, the method 900 may include receiving second message data from a second device associated with the second user profile. The second message data may be directed to at least one user profile of the first communal profile. The second message data may be received over a network, which may be similar to the network described above at block 902.

At block 906, the method 900 may include generating message thread data comprising the first message data and the second message data. In some instances, the first device and/or the second device may be associated with respective predefined communal profiles. The predefined communal profile(s) may include user profiles corresponding to users associated with the same family, user profiles corresponding to users residing in the same location, such as a home, user profiles corresponding to users selected to be in the predefined communal profile(s), and/or user profiles associated with a communal device. Generating the message thread data may be based at least in part on one or more factors indicating that the first message data and the second message data are associated. The factors may include a designation by users sending and/or receiving the first and second message data that the message data is associated. The factors may additionally, or alternatively, include a determination that the sender and the recipient of the first and second message data are members of predefined communal profiles. The factors may additionally, or alternatively, include a determination that the content of the first and second message data are relevant and/or related to each other. The factors may additionally, or alternatively, include a determination that the first message data and/or the second message data were sent to and/or from a communal device. The factors may additionally, or alternatively, include a determination that the first message data and the second message data include a predefined word and/or phrase indicating that the message data is associated.

In some instances, a file may be generated corresponding to the first message data and a file may be generated corresponding to the second message data. Generating the message thread data may include associating the files with each other, such as in a list. The associated files may be utilized to display the message data together as the message thread data. Additionally, or alternatively, the associated files may be introduced into a separate file corresponding to the message thread data. In other instances, upon determining that the files corresponding to the message data should be consolidated into message thread data, data of one file may be introduced into the other file, and the first file may be deleted.

At block 908, the method 900 may include sending a first instance of the message thread data to each user profile associated with the first communal profile. The message thread data or a portion thereof may be displayed on a user interface of the devices associated with the first communal profile. The portion of the message thread data may include a naming designation for the message thread data, such as a communal profile name. The portion of the message thread data may also include a time that a most recent message in the message thread data was sent and/or received. The portion of the message thread data may also include a portion of a message from the message thread data, such as a portion of the latest message that was sent or received. An indication may be received that the portion of the message thread data has been selected by a user of the first device. Based at least in part on the indication, the first message data and the second message data, along with other message data in the message thread data, may be displayed on the first device. Display of the first message data and the second message data may include an annotation showing the sender and/or recipient of the message data, a time that the message data was sent and/or received, text associated with the message data, and one or more symbols representing audio data associated with the message data. As additional messages are determined to be associated with message thread data, those additional messages may be merged, linked, or otherwise added to the message thread data and displayed, such as in chronological order.

At block 910, the method 900 may include sending a second instance of the message thread data to each user profile associated with the second communal profile. The message thread data or a portion thereof may be displayed on user interfaces of the devices associated with the second communal profile. The portion of the message thread data may include a naming designation for the message thread data, such as a communal profile name. The portion of the message thread data may also include a time that a most recent message in the message thread data was sent and/or received. The portion of the message thread data may also include a portion of a message from the message thread data, such as a portion of the latest message that was sent or received. An indication may be received that the portion of the message thread data has been selected by a user of the first device. Based at least in part on the indication, the first message data and the second message data, along with other messages in the message thread data, may be displayed on the second device. Display of the first message data and the second message data may include an annotation showing the sender and/or recipient of the message data, a time that the message data was sent and/or received, text associated with the message data, and one or more symbols representing audio data associated with the message data. As additional messages are determined to be associated with message thread data, those additional messages may be merged, linked, or otherwise added to the message thread data and displayed, such as in chronological order.

In some examples, one or more access controls may limit the message data that is displayed devices associated with the first and second communal profiles. For example, while the first message data and the second message data may be consolidated into a message thread, which may be accessible to each member of the first and second communal profiles, access to one or more messages in the thread may be controlled such that some messages, such as personal messages sent to a specific user and/or a specific user profile in the message thread, are accessible only to the specific user and/or profile. By way of illustration, the first message data may be sent to a member of the second communal profile and may be accessible by each user and/or user account and/or user profile associated with the first and second user profiles. However, the second message data, while in response to the first message data, may be intended for only members of the first communal profile and not the other members of the second communal profile. In this example, while the second message data may be consolidated with the first message data into the group message thread, the second message data may be only accessible by the sender and the members of the first communal profile. Members of the second communal profile may be restricted from viewing and/or hearing the second message data.

Figure 10:
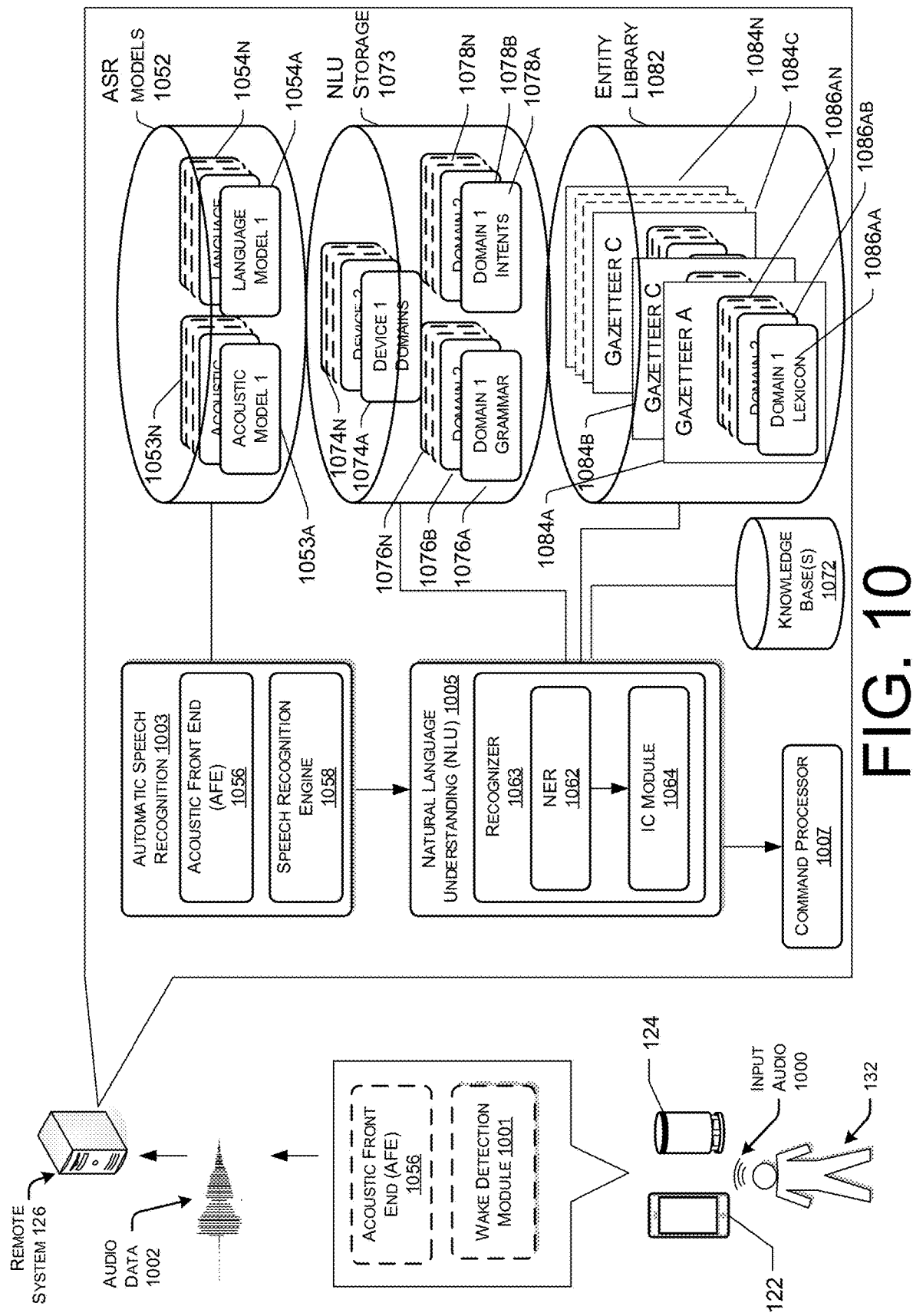
FIG. 10 illustrates a conceptual diagram of components of a speech processing system for processing audio data provided by one or more user devices.

FIG. 10 illustrates a conceptual diagram of how a spoken utterance can be processed, allowing a system to capture and execute commands spoken by a user, such as spoken commands that may follow a wakeword (i.e., a predefined word or phrase for "waking" a device, causing the device to begin sending audio data to a remote system, such as system 126). The various components illustrated may be located on a same or different physical devices. Communication between various components illustrated in FIG. 10 may occur directly or across a network 128. An audio capture component, such as a microphone of the device 122, the device 124, or another device, captures audio 1000 corresponding to a spoken utterance. The device 122 or 124, using a wakeword detection module 1001, then processes audio data corresponding to the audio 1000 to determine if a keyword (such as a wakeword) is detected in the audio data. Following detection of a wakeword, the device sends audio data 1002 corresponding to the utterance to the remote system 126 that includes an ASR module 1003. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR module 1003 of the remote system 126.

The wakeword detection module 1001 works in conjunction with other components of the user device, for example a microphone to detect keywords in audio 1000. For example, the device may convert audio 1000 into audio data, and process the audio data with the wakeword detection module 1001 to determine whether speech is detected, and if so, if the audio data comprising speech matches an audio signature and/or model corresponding to a particular keyword.

The user device may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by user device (or separately from speech detection), the user device may use the wakeword detection module 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 124 may "wake" and begin transmitting audio data 1002 corresponding to input audio 1000 to the remote system 126 for speech processing. Audio data corresponding to that audio may be sent to remote system 126 for routing to a recipient device or may be sent to the remote system 126 for speech processing for interpretation of the included speech (either for purposes of enabling voice-communications and/or for purposes of executing a command in the speech). The audio data 1002 may include data corresponding to the wakeword, or the portion of the audio data corresponding to the wakeword may be removed by the local device 124 prior to sending. Further, a local device may "wake" upon detection of speech/spoken audio above a threshold, as described herein. Upon receipt by the remote system 126, an ASR module 1003 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1003 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing a time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056) and transmit that information to a server across a network for ASR processing. Feature vectors may arrive at the remote system 126 encoded, in which case they may be decoded prior to processing by the processor executing the speech recognition engine 1058.

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 126, for natural language understanding (NLU) processing, such as conversion of the text into commands for execution, either by the user device, by the remote system 126, or by another device (such as a server running a specific application like a search engine, etc.).

The device performing NLU processing 1005 (e.g., server 126) may include various components, including potentially dedicated processor(s), memory, storage, etc. As shown in FIG. 10, an NLU component 1005 may include a recognizer 1063 that includes a named entity recognition (NER) module 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1003 based on the utterance input audio 1000) and attempts to make a semantic interpretation of the text. That is, the NLU process determines the meaning behind the text based on the individual words and then implements that meaning. NLU processing 1005 interprets a text string to derive an intent or a desired action from the user as well as the pertinent pieces of information in the text that allow a device (e.g., device 124) to complete that action. For example, if a spoken utterance is processed using ASR 1003 and outputs the text "send a message to Joe: Hi Joe, Congratulations . . . " the NLU process may determine that the user intended that the user device capture speech of the user for sending, as an audio file, for output on a device of "Joe."

The NLU may process several textual inputs related to the same utterance. For example, if the ASR 1003 outputs N text segments (as part of an N-best list), the NLU may process all N outputs to obtain NLU results.

As will be discussed further below, the NLU process may be configured to parsed and tagged to annotate text as part of NLU processing. For example, for the text "Send a message to Joe," "send a message" may be tagged as a command (to generate an audio file and send it for output) and "to Joe" may be tagged as a specific entity associated with the command.

To correctly perform NLU processing of speech input, an NLU process 1005 may be configured to determine a "domain" of the utterance so as to determine and narrow down which services offered by the endpoint device (e.g., remote system 126 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1062 receives a query in the form of ASR results and attempts to identify relevant grammars and lexical information that may be used to construe meaning. To do so, the NLU module 1005 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) module 1064 parses the query to determine an intent or intents for each identified domain, where the intent corresponds to the action to be performed that is responsive to the query. Each domain is associated with a database (1078a-1078n) of words linked to intents. For example, a music intent database may link words and phrases such as "quiet," "volume off," and "mute" to a "mute" intent. A voice-message intent database, meanwhile, may link words and phrases such as "send a message," "send a voice message," "send the following," or the like. The IC module 1064 identifies potential intents for each identified domain by comparing words in the query to the words and phrases in the intents database 1078. In some instances, the determination of an intent by the IC module 1064 is performed using a set of rules or templates that are processed against the incoming text to identify a matching intent.

In order to generate a particular interpreted response, the NER 1062 applies the grammar models and lexical information associated with the respective domain to actually recognize a mention one or more entities in the text of the query. In this manner, the NER 1062 identifies "slots" (i.e., particular words in query text) that may be needed for later command processing. Depending on the complexity of the NER 1062, it may also label each slot with a type of varying levels of specificity (such as noun, place, city, artist name, song name, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC module 1064 are linked to domain-specific grammar frameworks (included in 1076) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (1076) framework or frameworks may correspond to sentence structures such as "Send a message to {contact}," "Send a voice message to {contact}," "Send the following to {contact}," etc.

For example, the NER module 1062 may parse the query to identify words as subject, object, verb, preposition, etc., based on grammar rules and/or models, prior to recognizing named entities. The identified verb may be used by the IC module 1064 to identify intent, which is then used by the NER module 1062 to identify frameworks. A framework for the intent of "send a message," meanwhile, may specify a list of slots/fields applicable to play the identified "contact" and any object modifier (e.g., specifying a device of the recipient) or the like. The NER module 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1062 may search the database of generic words associated with the domain (in the knowledge base 1072). So, for instance, if the query was "send message to Joe," after failing to determine a last name for "Joe," the NER component 1062 may search the domain vocabulary for the word "Joe." In the alternative, generic words may be checked before the gazetteer information, or both may be tried, potentially producing two different results.

The output data from the NLU processing (which may include tagged text, commands, etc.) may then be sent to a command processor 1007. The destination command processor 1007 may be determined based on the NLU output. For example, if the NLU output includes a command to send a message, the destination command processor 1007 may be a message sending application, such as one located on the user device or in a message sending appliance, configured to execute a message sending command. If the NLU output includes a search request, the destination command processor 1007 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1005 during runtime operations where NLU operations are performed on text (such as text output from an ASR component 1003). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC module 1064 and other components such as an entity resolver, or other components.

For example, a messaging domain recognizer 1263-A (Domain A) may have an NER component 1262-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1263-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 126 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 126, as illustrated herein are exemplary, and may be located in a stand-alone device or may be included, in whole or in part, as a component of a larger device or system, may be distributed across a network or multiple devices connected by a network, etc.

Figure 11:
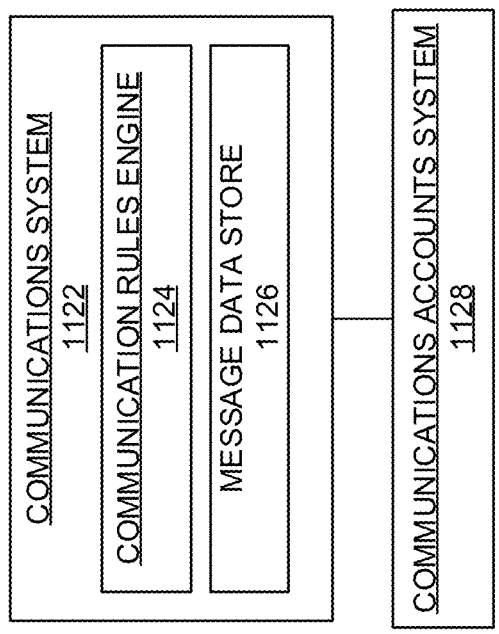
FIG. 11 illustrates a conceptual diagram of components of a messaging system for managing messages for a communal account.

FIG. 11 illustrates a conceptual diagram of components of a messaging system for managing messages for a communal account. A computing system, such the remote server 126 and/or one or more of devices 120, 122, or 124 may include, in a non-limiting embodiment, a communications system 1122, which may be configured to facilitate communications between two or more electronic devices. For example, communications system 1122 may be capable of facilitating a communications session between device 120 and at least device 122. Upon the remote system 126 determining that an intent of an utterance is for a communications session to be established with another device, the remote system 126 may access communications system 1122 to facilitate the communications session between the initiating device and the receiving device. For example, communications system 1122 may employ Voice over Internet Protocol (VoIP) functionality to facilitate audio, image, and/or text data communications between the initiating device and the recipient device.

As an illustrative example, a communications session between two devices is described below to illustrate how the communications session may be established. In one example embodiment, an individual may speak an utterance (e.g., "Alexa, send a message to John: 'Want to have dinner at my place?'") to their electronic device. In response to detecting the device's wakeword (e.g., "Alexa"), the electronic device may begin sending audio data representing the utterance to the remote system 126. Upon receipt, automatic speech recognition may be performed, such as speech-to-text processing, to the audio data to generate text data representing the audio data. Natural language understanding techniques, as described with respect to FIG. 10, may be performed to determine an intent of the utterance. If the format of the spoken utterance substantially matches one or more sample utterances corresponding to initiating a communications session, then that may indicate that an intent of the utterance was for a communications session to be initiated. For instance, one example sample utterance may be "{Wakeword}, send a message to {Contact Name}: {Message}." If the spoken utterance's text data substantially matches this sample utterance's framework, then the remote system 126 may determine that the intent of the utterance was to start a communications session with a contact of the user, and may also determine that the intended target of the communications session is "John" (e.g., {Contact Name}: John). After determining that a message is to be sent to a contact named "John," communications system 1122 may access communications accounts system 1128 to determine a device identifier (e.g., a device address) associated with the contact, "John."

In some embodiments, communications system 1122 may establish a communications session between an initiating device and a recipient device using one or more VoIP protocols including, but not limited to SIP, RTP, RTCP, SRTP, and SDP. In one illustrative embodiment, a SIP signaling command may be provided to communications system 1122 for communicating with the recipient device. In particular, PJSIP functionality adds a new "user-to-user" header that indicates the device pair for the communications session.

In one embodiment, communications system 1122 may include a communication rules engine 1124. Communications rules engine 1124 may store various rules for how certain communications between communal accounts and user accounts are to behave. For example, communications rules engine 1124 may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. In one illustrative embodiment, communication rules engine 1124 may store a communications table indicating various device identifiers, group account identifiers, communication identifiers, and device types for various devices interacting with communications system 1122, as described in greater detail below with reference to FIG. 12.

In some embodiments, communications system 1122 may also include a message data store 1126. Message data store 1126, in a non-limiting embodiment, may correspond to any suitable type of storage/memory capable of storing one or more messages sent/received. For example, when an individual sends a message (e.g., "Want to have dinner at my place?") from their communal device to another communal device, that message may be stored by communications system 1122 using message data store 1126. In some embodiments, message data store 1126 may be structured to store audio data representing audio message, video data representing video messages, image data representing image messages, text data representing text messages, and/or message notification metadata. When an individual utters a request to receive messages received for their user account and/or communal account, communications system 1122 may access message data store 1126 to obtain those messages, and may send the appropriate message data (e.g., audio, video, image, text, etc.) to the corresponding requesting device (e.g., personal device, communal device). In some embodiments, message data store 1126 may store each message with a corresponding communications identifier, communal account identifier, user account identifier, and/or device identifier with which that message is directed to. For example, if a first individual sends an audio message to a second individual, audio data representing that audio message may be stored by message data store 1126 with a communal account identifier associated with the second individual's corresponding communal account, as stored by communications accounts system 1128. This way, when an individual requests to receive messages associated with their communal account, message data store 1126 may be accessed to obtain any messages currently stored thereby that are associated with that communal account's communal account identifier.

Communications rules engine 1124 may employ several communications rules for messages sent/received to/from one or more participants. First, a device type of the sending device may be determined. For example, a determination may be made as to whether or not a device identifier associated with the device that the audio data representing an utterance, which includes a message to be sent to another individual's device, is associated with a communal device. Next, a determination may be made as to whether or not a speaker that spoke the utterance was able to be identified. Using these two parameters, for instance, communications rules engine 1124 may be configured to cause communications system 1122 to facilitate communications between two or more devices.

Communications accounts system 1128 may also store one or more communal accounts corresponding to one or more shared devices. For example, a communal device, such as device 124, may have its own communal account stored on communications accounts system 1128. The communal account may be associated with the communal device, and may also be linked to one or more individual's user accounts and/or profiles. For example, communal device 124 may be associated with a first communal account corresponding to a first grouping of individuals (e.g., a family). One or more user accounts may also be associated with the first communal account (e.g., individual members of the family), corresponding to individuals that may be capable of interacting with communal electronic device 124. Information, settings, and/or preferences, for example, for each user account may be stored within a user account database.

Figure 12:
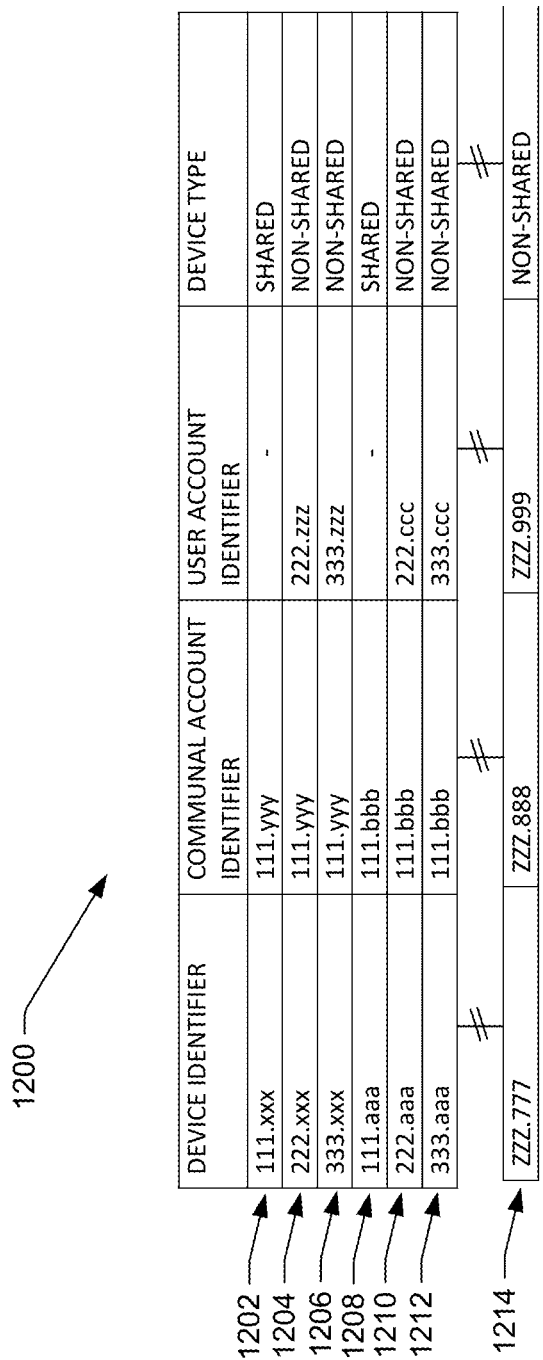
FIG. 12 illustrates an exemplary communications table.

FIG. 12 is an illustrative diagram of an exemplary communications table, in accordance with various embodiments. Communications table 1200, in a non-limiting embodiment, includes entries 1202-1214. Each entry may indicate a device identifier, a communal account identifier, a communication identifier, and a device type associated with a communication that is received or a communication to be sent. In some embodiments, each instance of a communication that is intended to be sent from one device to another device may result in a new entry added to communications table 1200. However, persons of ordinary skill in the art will recognize that upon receiving a communication from a device, additional entries may not be required, and the entry associated with a device's particular device identifier may be stored for any suitable amount of time by communications system 1122.

Device identifiers, as illustrated by communications table 1200, may correspond to any suitable identification means for a device that may interact with communications system 1122. Various types of device identifiers may include, but are not limited to, media access control ("MAC") identifiers, serial numbers, internet protocol ("IP") addresses, global positioning addresses, telephone numbers, messaging identifiers, and the like. As an illustrative example, when the communal device 124 of FIG. 1 sends audio data representing an utterance to the remote system 126, that audio data may be received with a device identifier unique to communal device 124 (e.g., device identifier of row 1202: "111.xxx"). Each device identifier, in one embodiment, is unique to that particular device with which it is associated with. Therefore, no two device identifiers should be identical, however persons of ordinary skill in the art will recognize that it is possible for two device identifiers to be the same.

A communal account identifier may correspond to an identifier that indicates a particular communal account on remote system 126, which may be stored by communications accounts system 1128, that a corresponding device identifier is associated with. For example, as seen by entry 1202, a device may have a device identifier 111.xxx, which may be associated with a communal account identifier 111.yyy. The communal account identifier may include multiple device identifiers, indicating that each corresponding device associated with one of those device identifiers is part of a same communal account. For example, entry 1204 may correspond to a device identifier 222.xxx, but may also correspond to the communal account identifier 111.yyy. This may indicate that a first device corresponding to entry 302 and a second device corresponding to entry 304 are both associated with a same group account (e.g., group account identifier 111.yyy). Similarly, entry 1206 may also indicate that another device, having device identifier 333.xxx, is also associated with the same communal account as the first and second devices associated with entries 1202 and 1204. Further still, entries 1208, 1210, and 1212 may also be associated with a same communal account, corresponding to communal account identifier 111.bbb, which differs from communal account identifier 111.yyy.

In some embodiments, each device identifier may also have an associated communication identifier. A communications identifier may be any suitable type of identifier used for identifying a participant of a communication. As an illustrative example, entry 1202 may indicate that a first device associated with device identifier 111.xxx has a communications identifier 111.zzz In some embodiments, the communications identifier may be configurable by a user of an associated device. For example, the communications identifier may be any suitable alphanumeric string of numbers, letters, and/or characters, that allow an individual to identify themselves when they send a message to, or receive a message from, another individual.

Also stored by communications table 1200 may be a device type associated with each device entry into table 1200. For example, communications table 1200 may indicate whether a device corresponding to a particular device identifier is a communal device or a mobile device. In one embodiment, a mobile device may be considered to be a personal device in that it is typically associated with a particular individual.

When audio data representing an utterance is received, a device identifier may also be received, either with the audio data (e.g., part of a header of the audio data), or separately (e.g., metadata received in addition to the audio data). Upon receiving the device identifier, communications system 1122 may determine an entry within communications table 1200 matching that device identifier. After determining the device identifier, a corresponding communal identifier for that device identifier may also be determined, and a determination of whether or not that device is a communal device may occur.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   computer-readable media storing computer-executable instructions that, when executed by the one or more processors, cause the one or more processors to perform operations comprising:
   storing information indicating that a first user profile, a second user profile, and a third user profile are associated with a communal device in a household, the first user profile, the second user profile, and the third user profile associated with a communal profile, the third user profile designated as an administrator of the communal profile;
receiving first message data from a first device associated with the first user profile;
receiving second message data from a second device associated with the second user profile, the second message data including first audio data;
generating message thread data comprising the first message data and the second message data, the message thread data being generated based at least in part on the information indicating that the first user profile and the second user profile are associated with the communal device;
sending the message thread data to devices associated with the communal profile such that the message thread data is accessible to user profiles associated with the communal profile;
receiving third message data including second audio data, the third message data from the first device and directed to the second user profile instead of the communal profile;
generating data representing access controls associated with the third message data, the access controls causing the third message data to be accessible by the first user profile and the second user profile based at least in part on the third message data being directed to the second user profile instead of the communal profile;
sending the third message data as a portion of the message thread data, the third message data applying the access controls;
causing the second device to display a selectable control that, when selected, causes a speaker of the second device to output audio corresponding to the second audio data, the selectable control included in the message thread data such that the selectable control is visible to the second user profile instead of the communal profile;
causing the third user profile associated with a third device to bypass the access controls such that the third message data is accessible by the third user profile based at least in part on the third user profile being designated as the administrator of the communal profile; and
wherein the communal profile is based at least in part on an indication that a first user associated with the first user profile and a second user associated with the second user profile have a familial relationship, the indication based at least in part on identifying a word that corresponds to a title of a family member in at least one of the first message data or the second message data.

2. The system of claim 1, further comprising causing the first device and the second device to display an indication that the third message data and the selectable control are only visible to the first user profile and the second user profile instead of the communal profile, wherein the indication is displayed within the message thread data and is visible only to the first user profile and the second user profile instead of the communal profile.

3. The system of claim 1, wherein the third message data is displayed within the message thread data that is displayed to the third user profile.

4. A method comprising:
storing information indicating that user profiles are associated with a predefined communal profile, the predefined communal profile indicating one or more of the user profiles associated with a communal device;
generating, at a first device, first message data based at least in part on input from a first user associated with a first user profile of the user profiles, the first message data directed to at least one user profile of the user profiles;
receiving second message data from a second device associated with a second user profile of the user profiles, the second message data including first audio data that is directed to the at least one user profile of the user profiles;
generating message thread data that includes the first message data and the second message data based at least in part on the first user profile and the second user profile being associated with the predefined communal profile, the message thread data causing the first message data and the second message data to be accessible by the one or more user profiles associated with the communal device;
sending the message thread data to devices associated with the predefined communal profile such that the message thread data is accessible to the user profiles associated with the predefined communal profile;
receiving third message data including second audio data associated with the first user profile, the third message data directed to the second user profile instead of the predefined communal profile;
generating data representing access controls associated with the third message data, the access controls causing the third message data to be accessible by the first user profile and the second user profile based at least in part on the third message data being directed to the second user profile instead of the predefined communal profile;
sending the third message data as a portion of the message thread data, the third message data applying the access controls;
causing the second device to display a selectable control that, when selected, causes a speaker of the second device to output audio corresponding to the second audio data, the selectable control included in the message thread data such that the selectable control is visible to the second user profile instead of the predefined communal profile;
causing a third user profile, associated with a third device, of the user profiles to bypass the access controls such that the third message data is accessible by the third user profile based at least in part on the third user profile being designated as an administrator of the predefined communal profile; and
wherein the predefined communal profile is based at least in part on an indication that the first user associated with the first user profile and a second user associated with the second user profile have a familial relationship, the indication based at least in part on identifying a word that corresponds to a title of a family member in at least one of the first message data or the second message data.

5. The method of claim 4, wherein the first message data corresponds to audio data generated by a microphone of the first device.

6. The method of claim 4, wherein the predefined communal profile is based at least in part on a user setting that designates one or more of the user profiles as being associated with the predefined communal profile.

7. The method of claim 4, wherein generating the message thread data comprises generating a list that includes the first message data and the second message data.

8. The method of claim 4, wherein generating the message thread data is based at least in part on a designation that at least one of the first message data or the second message data is directed to the predefined communal profile.

9. The method of claim 4, wherein the predefined communal profile comprises a first predefined communal profile, and further comprising:
receiving fourth message data from a fourth device associated with a fourth user profile of a second predefined communal profile; and
causing the fourth message data to be associated with the first message data and the second message data in the message thread data based at least in part on an indication that the fourth message data is directed to at least one of the first user profile or the second user profile.

10. The method of claim 4, further comprising determining to refrain from sending a command to display the selectable control to the communal device based at least in part on the third message data being directed to the second user profile instead of the predefined communal profile.

11. The method of claim 4, further comprising causing the first device and the second device to display an indication that the third message data and the selectable control are only visible to the first user profile and the second user profile instead of the predefined communal profile, wherein the indication is displayed within the message thread data and is visible only to the first user profile and the second user profile instead of the predefined communal profile.

12. The method of claim 4, wherein the predefined communal profile includes a fourth user profile associated with the predefined communal profile, the fourth user profile prevented from accessing the third message data based at least in part on the access controls.

13. A system comprising:
one or more processors; and
computer-readable media storing computer-executable instructions that, when executed by the one or more processors, cause the one or more processors to perform operations comprising:
receiving first message data from a first device associated with a first user profile of a first communal profile, the first message data directed to a second user profile associated with a second communal profile;
receiving second message data from a second device associated with the second user profile, the second message data directed to at least one user profile associated with the first communal profile;
generating, based at least in part on at least one of the first device or the second device being a communal device, message thread data comprising the first message data and the second message data;
sending a first instance of the message thread data to devices associated with the first communal profile such that the message thread data is accessible to user profiles associated with the first communal profile;
sending a second instance of the message thread data to user profiles associated with the second communal profile;
receiving third message data, the third message data directed to the second user profile instead of the second communal profile;
generating data representing access controls associated with the third message data, the access controls causing the third message data to be accessible by the first user profile and the second user profile;
sending the third message data as a portion of the message thread data, the third message data applying the access controls;
causing a third user profile, associated with a third device, of the second communal profile to bypass the access controls such that the third message data is accessible by the third user profile based at least in part on the third user profile being designated as an administrator of the second communal profile; and
wherein the first message data comprises first text data, the second message data comprises second text data, and the operations further comprising:
receiving fourth message data, the fourth message data comprising third text data;
determining that a first phrase from the third text data corresponds to a second phrase from at least one of the first text data or the second text data; and
causing the fourth message data to be included in the message thread data based at least in part on the determining that the first phrase corresponds to the second phrase.

14. The system of claim 13, wherein generating the message thread data is based at least in part on a user setting indicating that message data sent between devices associated with the first communal profile and the second communal profile are to be included in the message thread data.

15. The system of claim 13, wherein generating the message thread data is based at least in part on a determination that a first word or a first phrase of first text data associated with the first message data matches a second word or a second phrase of second text data associated with the second message data.

16. The system of claim 13, the operations further comprising:
causing the message thread data to be displayed on user devices associated with the first communal profile; and
causing the message thread data to be displayed on user devices associated with the second communal profile.

17. The system of claim 13, wherein the first message data corresponds to audio data received from a device associated with the first communal profile, and the operations further comprising determining, from at least one of the audio data or text data corresponding to the audio data, intent data indicating that the first message data is to be sent to the second communal profile.

18. The system of claim 13, wherein generating the message thread data is based at least in part on the first message data and the second message data containing a predefined word.

* * * * *